US012693117B2

(12) United States Patent
Savikovsky et al.

(10) Patent No.: US 12,693,117 B2
(45) Date of Patent: Jul. 28, 2026

(54) THREE-DIMENSIONAL PROJECTOR AND METHOD

(71) Applicant: FARO Technologies, Inc., Lake Mary, FL (US)

(72) Inventors: Arkady Savikovsky, Burlington, MA (US); Joel Stave, New Boston, NH (US); Ilya Alexeev, Paoli, PA (US); Matthew T. Armstrong, Glenmoore, PA (US); Robert E. Bridges, Kennett Square, PA (US)

(73) Assignee: Virtek Vision Inc., Waterloo (CA)

( * ) Notice: Subject to any disclaimer, the term of this patent is extended or adjusted under 35 U.S.C. 154(b) by 421 days.

(21) Appl. No.: 18/364,691

(22) Filed: Aug. 3, 2023

(65) Prior Publication Data

US 2024/0167817 A1 May 23, 2024

Related U.S. Application Data

(60) Provisional application No. 63/427,116, filed on Nov. 22, 2022.

(51) Int. Cl.
| | |
|---|---|
| *G01C 15/00* | (2006.01) |
| *G02B 26/10* | (2006.01) |
| *F16M 11/22* | (2006.01) |

(52) U.S. Cl.
CPC ......... *G01C 15/006* (2013.01); *G02B 26/105* (2013.01); *F16M 11/22* (2013.01)

(58) Field of Classification Search
CPC .. G02B 26/105; G02B 26/0816; G02B 27/48; G02B 30/56; G02B 7/04; G02B 7/08; G01C 15/006; G01C 15/02; G03B 21/145
(Continued)

(56) References Cited

U.S. PATENT DOCUMENTS

| | | | | |
|---|---|---|---|---|
| 5,400,132 A | * | 3/1995 | Trepagnier | ........... G01B 21/042 |
| | | | | 700/62 |
| 6,547,397 B1 | * | 4/2003 | Kaufman | ............. G01B 11/002 |
| | | | | 372/24 |

(Continued)

FOREIGN PATENT DOCUMENTS

| | | |
|---|---|---|
| EP | 1277066 A2 | 1/2003 |
| EP | 1277066 B1 | 11/2008 |

OTHER PUBLICATIONS

International Preliminary Report on Patentability for Application No. PCT/US2023/080695, dated Jun. 5, 2025, 10 pages.

(Continued)

*Primary Examiner* — Peter J Macchiarolo
*Assistant Examiner* — Anna Josephine Saunders
(74) *Attorney, Agent, or Firm* — McCarter & English, LLP; Dave S. Christensen; Joseph C. Drish

(57) ABSTRACT

A method includes attaching a 3D projector to a stand, the 3D projector having a projecting mechanism and a gimbal mechanism; determining a six degree-of-freedom pose of the 3D projector based at least in part on steering at least one of the projecting mechanism and the gimbal mechanism to place the beam of light on each of a plurality of anchor targets in each of a first instance and a second instance, each anchor target having an anchor point with 3D coordinates known in a CAD model, each projection angle and gimbal angle to each of the plurality of anchor targets being different in first instance and the second instance.

20 Claims, 33 Drawing Sheets

(58) Field of Classification Search
USPC ................ 353/28; 356/138, 4.01; 359/202.1
See application file for complete search history.

(56) References Cited

U.S. PATENT DOCUMENTS

| | | | |
|---|---|---|---|
| 10,408,606 B1 * | 9/2019 | Raab ......................... | G06T 7/97 |
| 10,655,946 B2 * | 5/2020 | Tahir ...................... | G01B 11/03 |
| 2012/0038549 A1 * | 2/2012 | Mandella ................ | G06F 3/011 |
| | | | 345/156 |
| 2012/0265479 A1 * | 10/2012 | Bridges ................... | G01C 3/08 |
| | | | 702/135 |
| 2015/0015700 A1 * | 1/2015 | Becker .................... | G01S 17/66 |
| | | | 348/136 |
| 2016/0098095 A1 * | 4/2016 | Gonzalez-Banos ..... | A63F 13/92 |
| | | | 345/156 |
| 2016/0313114 A1 * | 10/2016 | Tohme ................. | H04N 13/257 |
| 2017/0003372 A1 * | 1/2017 | Antoina ................. | G01S 3/783 |
| 2017/0108528 A1 * | 4/2017 | Atlas ...................... | G01P 13/025 |
| 2022/0201259 A1 | 6/2022 | Hayashi et al. | |
| 2024/0167817 A1 * | 5/2024 | Savikovsky ......... | G01C 15/006 |
| 2025/0224231 A1 * | 7/2025 | Yehuday ............. | H04N 9/3185 |

OTHER PUBLICATIONS

International Search Report and Written Opinion for Application No. PCT/US2023/080695, dated Apr. 8, 2024, 16 pages.

* cited by examiner

SECTION A-A

1200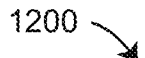

| | |
|---|---|
| Create layout plan | 1202 |

Create layout plan                                                      <u>1202</u>
    - Import CAD model
    - Identify anchor points in CAD model
    - Identify critical projection points for each construction object
    - Optionally select order of projection Prepare targets                                                          <u>1204</u>
    - Optionally place reflective targets over anchor points on floor
    - Optionally place reflective targets on bipod stands
    - Optionally place reflective targets on stable walls Set up and register 3D projection device                                <u>1206</u>
    - Place device on tripod and adjust height
    - Power on and initialize 3D projection device
    - Connect 3D projection device to mobile computing device
    - Measure each of 3 or more targets with the 3D projection device
    - Determine the pose of the 3D projection device in the CAD model Project glowing template for each construction object                   <u>1208</u>
    - Measure floor height at each critical projection point
    - Use the galvo mirrors to project a template pattern
    - Construct over glowing template or mark template points on surface

FIG. 12

1800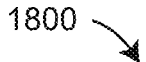

---

1802 affixing a three-dimensional (3D) projector to a stand, the 3D projector having a projecting mechanism and a gimbal mechanism, the projecting mechanism being operable to steer a beam of light to a projection angle relative to the gimbal mechanism, the gimbal mechanism being operable to steer the 3D projector to a gimbal angle relative to the stand

---

1804 determining a six degree-of-freedom (six-DOF) pose of the 3D projector based at least in part on steering at least one of the projecting mechanism and the gimbal mechanism to place the beam of light on each of a plurality of anchor targets in each of a first instance and a second instance, each anchor target having an anchor point with 3D coordinates known in a computer-aided design (CAD) model, each projection angle and gimbal angle to each of the plurality of anchor targets being different in the first instance and the second instance

---

1806 storing the determined six-DOF pose of the 3D projector

| Field | $x$, mm | $y$, mm | $z$, mm | Az | Ze |
|---|---|---|---|---|---|
| 1F | 10,000 | 0 | -3,080 | 25° | 103° |
| 1S | 10,000 | 0 | -3,080 | -22° | 103° |
| 2F | -1,800 | 9,500 | -3,080 | 116° | 123 |
| 2S | -1,800 | 9,500 | -3,080 | 84° | 95° |
| 3F | -8,000 | -7,000 | -3,080 | 227° | 84° |
| 3S | -8,000 | -7,000 | -3,080 | 216° | 128° |

| Target | Field | H, radians | V, radians |
|---|---|---|---|
| 1 | 1F | +0.471239 | +0.094248 |
| 2 | 2F | +0.282743 | -0.282743 |
| 3 | 3F | +0.094248 | +0.471239 |

| Target | Field | H, radians | V, radians |
|---|---|---|---|
| 1 | 1S | -0.471239 | -0.094248 |
| 2 | 2S | -0.282743 | +0.282743 |
| 3 | 3S | -0.094248 | -0.471239 |

2000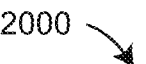

| | |
|---|---|
| aiming a three-dimensional (3D) projector to a point having selected 3D coordinates on an as-designed surface of a computer-aided design (CAD) model, the aiming being at a first frontsight angle of a first angular transducer and a second frontsight angle of a second angular transducer, the first angular transducer and the second angular transducer being coupled to the 3D projector | 2002 |

| | |
|---|---|
| projecting a beam of light from the rangefinder to the point on the as-built surface and reading with the rangefinder a frontsight distance | 2004 |

| | |
|---|---|
| for a reference point located at the first frontsight angle, the second frontsight angle, and the frontsight distance, determining with a processor 3D coordinates of the reference point as given in a backsight mode of the 3D projector | 2006 |

| | |
|---|---|
| with the 3D projector in the backsight mode, aiming the 3D projector at the determined 3D coordinates of the reference point as given in the backsight mode of the 3D projector, projecting a second beam of light from the 3D projector toward the reference point as given in the backsight mode of the 3D projector, and measuring with the rangefinder a backsight distance to the as-built surface | 2008 |

| | |
|---|---|
| with the processor, determining corrected 3D coordinates of the as-built surface based at least in part on the first frontsight angle, the second frontsight angle, and an average of the measured frontsight distance and the measured backsight distance | 2010 |

| | |
|---|---|
| storing the corrected 3D coordinates of the as-built surface | 2012 |

FIG. 20

2300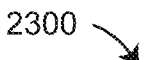

| | |
|---|---|
| steering with a first galvanometer mirror and a second galvanometer mirror a beam of light from a galvanometer light source to a first multiplicity of positions on a first compensation mirror and receiving first returning light at a galvanometer optical detector, wherein the first galvanometer mirror, the second galvanometer mirror, the galvanometer light source, and the galvanometer optical detector are part of a galvanometer system, the galvanometer system being operatively coupled to the first compensation mirror | 2302 |

| | |
|---|---|
| steering with the first galvanometer mirror and the second galvanometer mirror a beam of light from the galvanometer light source to a second multiplicity of positions on a second compensation mirror and receiving second returning light at the galvanometer optical detector, the galvanometer system being operatively coupled to the second compensation mirror | 2304 |

| | |
|---|---|
| determining with a processor an angular offset parameter and an angular scale parameter of the galvanometer system based at least in part on the first multiplicity of positions and the second multiplicity of positions | 2306 |

| | |
|---|---|
| storing the determined angular offset parameter and the determined angular scale parameter | 2308 |

FIG. 23

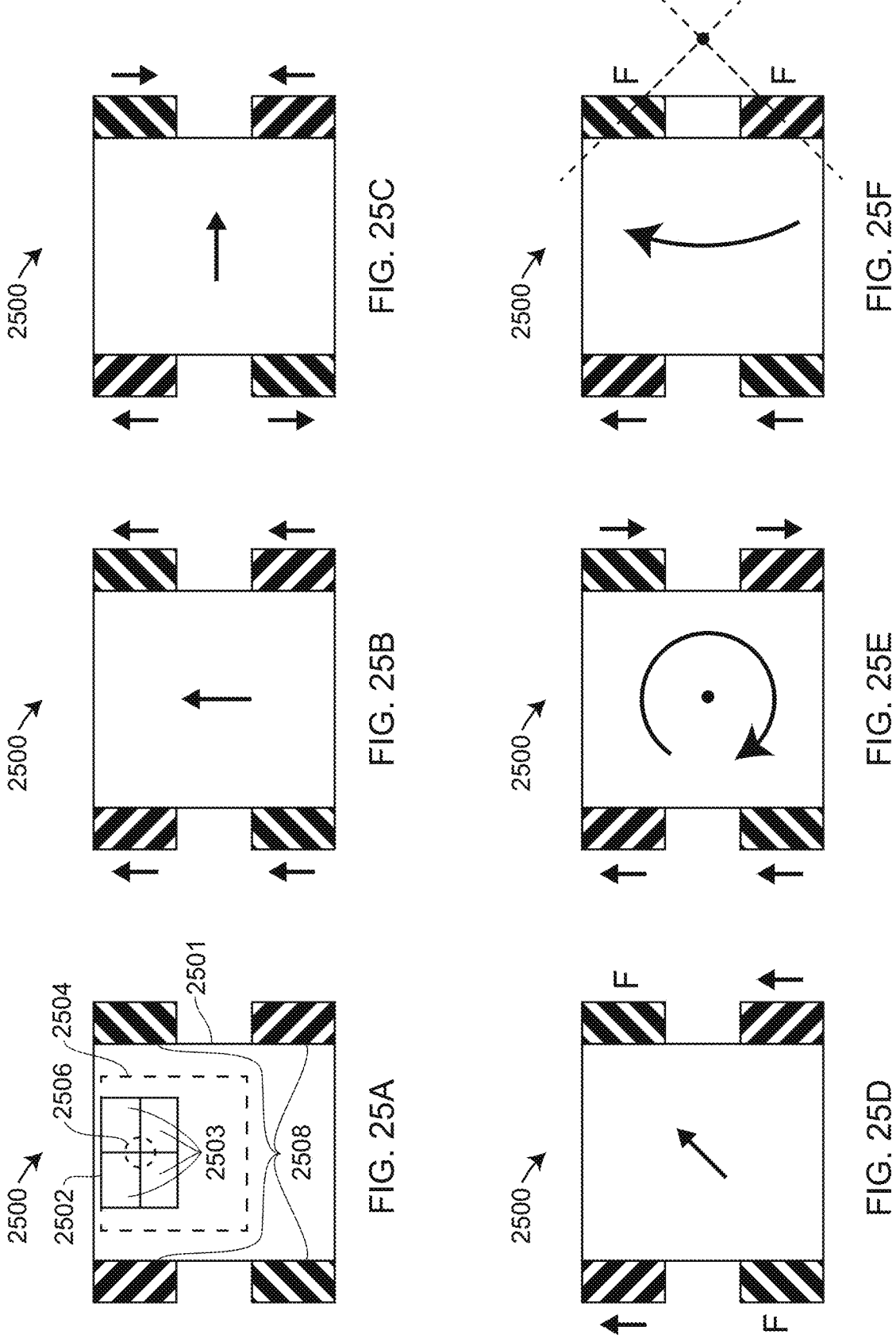

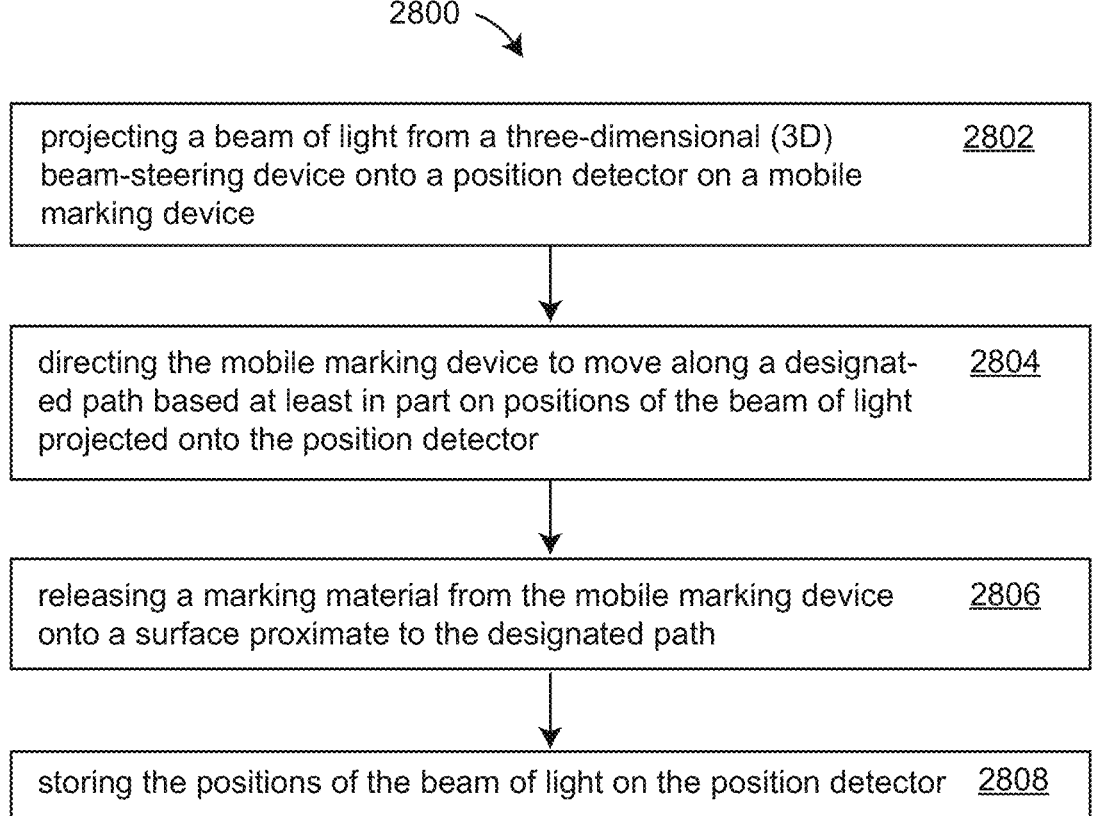

2800

| | |
|---|---|
| projecting a beam of light from a three-dimensional (3D) beam-steering device onto a position detector on a mobile marking device | 2802 |

| | |
|---|---|
| directing the mobile marking device to move along a designated path based at least in part on positions of the beam of light projected onto the position detector | 2804 |

| | |
|---|---|
| releasing a marking material from the mobile marking device onto a surface proximate to the designated path | 2806 |

| | |
|---|---|
| storing the positions of the beam of light on the position detector | 2808 |

FIG. 28

THREE-DIMENSIONAL PROJECTOR AND METHOD

CROSS-REFERENCE TO RELATED APPLICATIONS

This application claims the benefit of U.S. Provisional Patent Application Ser. No. 63/427,116, filed Nov. 22, 2022, and entitled "THREE-DIMENSIONAL PROJECTOR AND METHOD," the contents of which are incorporated by reference herein in their entirety.

BACKGROUND

The present disclosure relates to a light projection system that projects a glowing light pattern onto an object. Such a system is often referred to as a "laser projection system," a "laser projector," or a three-dimensional (3D) projector.

3D projectors are often used in assembly applications. Such systems may include two galvanometer mirrors, each steered by a galvanometer motor and having a galvanometer angular transducer. 3D projectors using galvanometer mirrors may project a glowing template pattern onto an object at more than 30 Hz, thereby minimizing or eliminating flicker. 3D projectors are often used, for example, to assist in positioning multiple layers of composite ply material onto aircraft components such as wings.

There is a need today to adapt 3D projectors to assist in construction or manufacturing in architecture, engineering, and construction (AEC) applications. In construction, surveyors or general contractors typically use total stations or other surveying devices to place control point markers at 3D coordinates indicated on a computer-aided drawing (CAD), sometimes referred to as a layout drawing. To add building elements such as walls or cutouts to a building environment, workers often make marks or snap chalk lines based on measurements made with tools such as tape measures and levels. In other cases, a separate crew will use a total station to accurately mark positions at which building elements are to be positioned.

There is a need today for an improved 3D projector that will enable rapid and accurate positioning of building elements according to a building plan. Accordingly, while existing approaches are suitable for their intended purposes, there remains a need for a 3D projector having the features described herein.

BRIEF DESCRIPTION

According to an embodiment, a method is provided. The method includes affixing a three-dimensional (3D) projector to a stand, the 3D projector having a projecting mechanism and a gimbal mechanism, the projecting mechanism being operable to steer a beam of light to a projection angle relative to the gimbal mechanism, the gimbal mechanism being operable to steer the 3D projector to a gimbal angle relative to the stand. The method further includes determining a six degree-of-freedom (six-DOF) pose of the 3D projector based at least in part on steering at least one of the projecting mechanism and the gimbal mechanism to place the beam of light on each of a plurality of anchor targets in each of a first instance and a second instance, each of the plurality of anchor targets having a respective one of a plurality of anchor points with 3D coordinates known in a computer-aided design (CAD) model, each projection angle and gimbal angle to each of the plurality of anchor targets being different in the first instance and the second instance. The method further includes storing the determined six-DOF pose of the 3D projector.

In addition to one or more of the features described herein, or as an alternative, further embodiments of the method may include that the projecting mechanism further is configured to emit a first beam of light onto a first galvanometer mirror, rotate the first galvanometer mirror to a first mirror angle with a first galvanometer motor, reflect the first beam of light off the first galvanometer mirror onto a second galvanometer mirror, rotate the second galvanometer mirror to a second mirror angle with a second galvanometer motor, and send the first beam of light out of an exit-aperture of the 3D projector.

In addition to one or more of the features described herein, or as an alternative, further embodiments of the method may include determining angular scale error parameters of the projecting mechanism and angular offset error parameters of the projection mechanism.

In addition to one or more of the features described herein, or as an alternative, further embodiments of the method may include that determining the six-DOF pose of the 3D projector further comprises, for each of the plurality of anchor points and in each of the first instance and the second instance: sending the beam of light to a plurality of positions on the anchor target; and determining a position of the anchor point on the anchor target based at least in part on a signal produced by an optical detector of the 3D projector, the signal being produced in response to light reflected off the plurality of positions.

In addition to one or more of the features described herein, or as an alternative, further embodiments of the method may include that determining the six-DOF pose of the 3D projector further comprises, for each of the plurality of anchor points and in each of the first instance and the second instance: determining a position of the anchor point on the anchor target based at least in part on an image of the anchor target captured by an image sensor operably coupled to the 3D projector.

In addition to one or more of the features described herein, or as an alternative, further embodiments of the method may include projecting with the projecting mechanism a projected pattern of light onto an as-built surface, the projected pattern of light taking a form of a glowing template pattern, the projected pattern of light based at least in part on the CAD model and the determined six-DOF pose.

In addition to one or more of the features described herein, or as an alternative, further embodiments of the method may include further basing the projected pattern of light on a distance to the as-built surface measured by a rangefinder of the 3D projector, the rangefinder being either integral to the projecting mechanism or included as a separate element of the 3D projector.

In addition to one or more of the features described herein, or as an alternative, further embodiments of the method may include projecting with the projecting mechanism the projected pattern of light onto the as-built surface, the projected pattern of light further based at least in part on a determining of 3D coordinates of a plurality of surface points on the as-built surface.

In addition to one or more of the features described herein, or as an alternative, further embodiments of the method may include: aiming the 3D projector to a point having selected 3D coordinates on an as-designed surface of the CAD model, the aiming being at a first frontsight angle of a first angular transducer and a second frontsight angle of a second angular transducer, the first angular transducer and the second angular transducer being coupled to the 3D projector; projecting a beam of light from a rangefinder to the point on the as-built surface and reading with the rangefinder a frontsight distance; for a reference point located at the first frontsight angle, the second frontsight angle, and the frontsight distance, determining with a processor 3D coordinates of the reference point as given in a backsight mode of the 3D projector; with the 3D projector in the backsight mode, aiming the 3D projector at the determined 3D coordinates of the reference point as given in the backsight mode of the 3D projector, projecting a second beam of light from the 3D projector toward the reference point as given in the backsight mode of the 3D projector, and measuring with the rangefinder a backsight distance to the as-built surface; with the processor, determining corrected 3D coordinates of the as-built surface based at least in part on the first frontsight angle, the second frontsight angle, and an average of the measured frontsight distance and the measured backsight distance; and storing the corrected 3D coordinates of the as-built surface.

In addition to one or more of the features described herein, or as an alternative, further embodiments of the method may include: steering with a first galvanometer mirror and a second galvanometer mirror a beam of light from a galvanometer light source to a first multiplicity of positions on a first compensation mirror and receiving first returning light at a galvanometer optical detector, wherein the first galvanometer mirror, the second galvanometer mirror, the galvanometer light source, and the galvanometer optical detector are part of a galvanometer system, the galvanometer system being operatively coupled to the first compensation mirror; steering with the first galvanometer mirror and the second galvanometer mirror a beam of light from the galvanometer light source to a second multiplicity of positions on a second compensation mirror and receiving second returning light at the galvanometer optical detector, the galvanometer system being operatively coupled to the second compensation mirror; determining with a processor an angular offset parameter and an angular scale parameter of the galvanometer system based at least in part on the first multiplicity of positions and the second multiplicity of positions; and storing the determined angular offset parameter and the determined angular scale parameter.

In addition to one or more of the features described herein, or as an alternative, further embodiments of the method may include: projecting a beam of light from the three-dimensional (3D) projector onto a position detector on a mobile marking device; directing the mobile marking device to move along a designated path based at least in part on positions of the beam of light projected onto the position detector; releasing a marking material from the mobile marking device onto a surface proximate to the designated path; and storing the positions of the beam of light on the position detector.

According to an embodiment, a system is provided. The system includes a stand and a three-dimensional (3D) projector affixed to the stand, the 3D projector having a projecting mechanism and a gimbal mechanism, the projecting mechanism being operable to steer a beam of light to a projection angle relative to the gimbal mechanism, the gimbal mechanism being operable to steer the 3D projector to a gimbal angle relative to the stand. The system further includes a processor configured to determine a six degree-of-freedom (six-DOF) pose of the 3D projector based at least in part on steering at least one of the projecting mechanism and the gimbal mechanism to place the beam of light on each of a plurality of anchor targets in each of a first instance and a second instance, each of the plurality of anchor targets having a respective one of a plurality of anchor points with 3D coordinates known in a computer-aided design (CAD) model, each projection angle and gimbal angle to each of the plurality of anchor targets being different in the first instance and the second instance; and store the determined six-DOF pose of the 3D projector.

In addition to one or more of the features described herein, or as an alternative, further embodiments of the system may include that the projecting mechanism further is configured to emit a first beam of light onto a first galvanometer mirror, rotate the first galvanometer mirror to a first mirror angle with a first galvanometer motor, reflect the first beam of light off the first galvanometer mirror onto a second galvanometer mirror, rotate the second galvanometer mirror to a second mirror angle with a second galvanometer motor, and send the first beam of light out of an exit-aperture of the 3D projector.

In addition to one or more of the features described herein, or as an alternative, further embodiments of the system may include that the processor is further configured to determine angular scale error parameters of the projecting mechanism and angular offset error parameters of the projection mechanism.

In addition to one or more of the features described herein, or as an alternative, further embodiments of the system may include that determining the six-DOF pose of the 3D projector further comprises, for each of the plurality of anchor points and in each of the first instance and the second instance: sending the beam of light to a plurality of positions on the anchor target; and determining a position of the anchor point on the anchor target based at least in part on a signal produced by an optical detector of the 3D projector, the signal being produced in response to light reflected off the plurality of positions.

In addition to one or more of the features described herein, or as an alternative, further embodiments of the system may include that determining the six-DOF pose of the 3D projector further comprises, for each of the plurality of anchor points and in each of the first instance and the second instance: determining a position of the anchor point on the anchor target based at least in part on an image of the anchor target captured by an image sensor operably coupled to the 3D projector.

In addition to one or more of the features described herein, or as an alternative, further embodiments of the system may include that the projecting mechanism is further configured to project a projected pattern of light onto an as-built surface, the projected pattern of light taking a form of a glowing template pattern, the projected pattern of light based at least in part on the CAD model and the determined six-DOF pose.

In addition to one or more of the features described herein, or as an alternative, further embodiments of the system may include that the projected pattern of light is based on a distance to the as-built surface measured by a rangefinder of the 3D projector, the rangefinder being either integral to the projecting mechanism or included as a separate element of the 3D projector.

In addition to one or more of the features described herein, or as an alternative, further embodiments of the system may include that the projecting mechanism projects the projected pattern of light onto the as-built surface, the projected pattern of light further based at least in part on a determining of 3D coordinates of a plurality of surface points on the as-built surface.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of embodiments of the invention are apparent from the following detailed description taken in conjunction with the accompanying drawings in which:

FIG. 12 is a block diagram showing elements of a method leading to projecting of a glowing template into an environment according to an embodiment of the present disclosure;

FIG. 18 is a block diagram showing elements of a method for determining a pose of a 3D scanner, while also determining several compensation parameters according to an embodiment of the present disclosure;

FIG. 20 shows elements of a method for using a rangefinder to determine corrected 3D coordinates on an as-built surface according to an embodiment of the present disclosure;

FIG. 23 shows elements of a method for determining an angular offset parameter and an angular scale parameter for the galvanometer system according to an embodiment of the present disclosure.

FIG. 25A shows a mobile marking device having a position detector, an ink supply, a nozzle, and steering wheels according to an embodiment of the present disclosure;

FIGS. 25B, 25C, 25D, 25E, 25F show a mobile marking device having Mecanum wheels operable to steer the mobile marking device forward, sideways, diagonally, in a circle about a point, and in a curve, respectively, according to an embodiment of the present disclosure;

FIG. 28 shows elements of a method for directly a mobile marking device to place desired marks on a surface according to an embodiment of the present disclosure.

The detailed description explains embodiments of the disclosure, together with advantages and features, by way of example with reference to the drawings.

DETAILED DESCRIPTION

Improvements in 3D projectors and the ways in which they are used are described below, with emphasis given to construction applications in the building industry.

Figure 1:
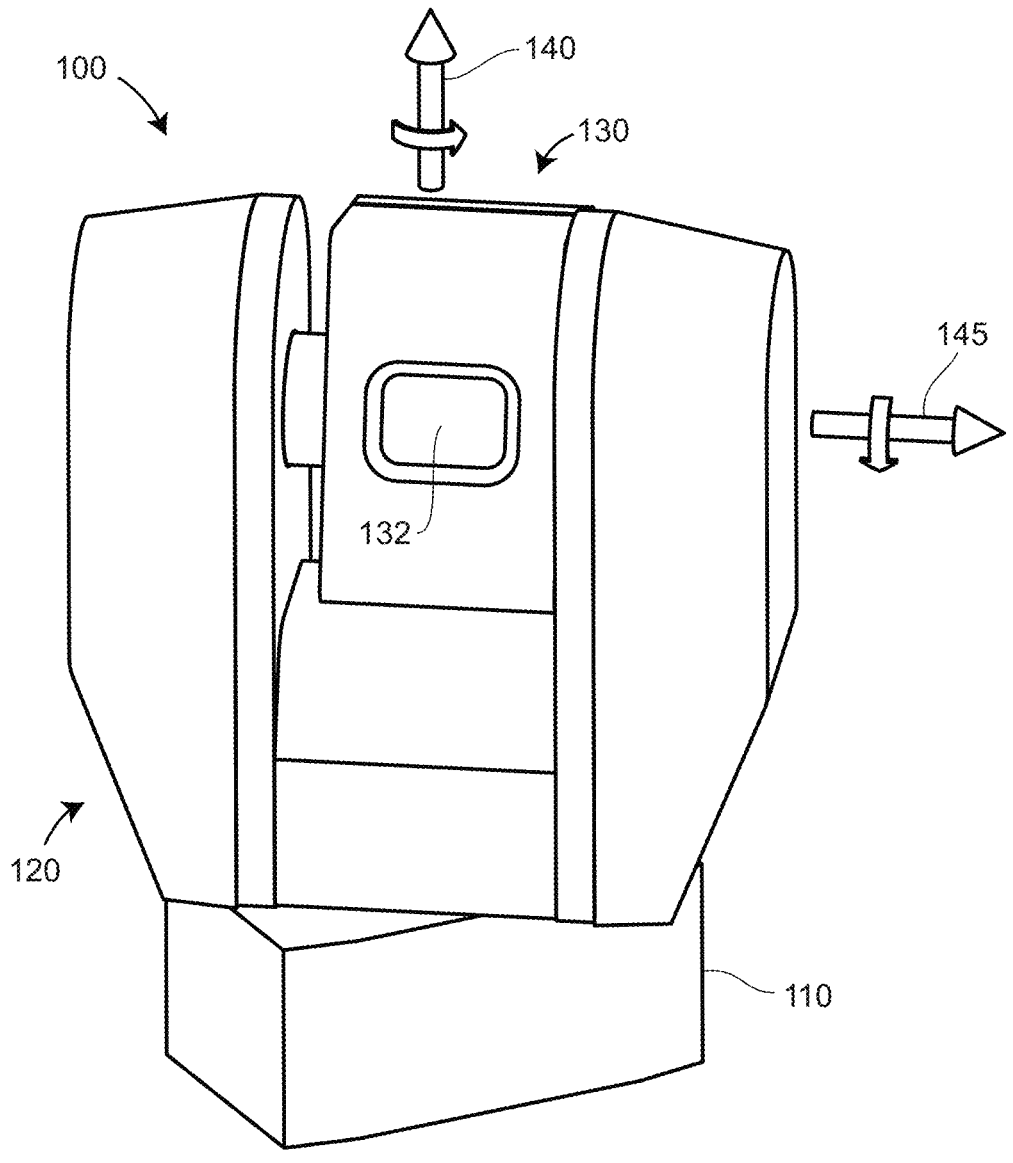
FIG. 1 is an isometric view of a 3D projector according to an embodiment of the present disclosure.

FIG. 1 illustrates, in isometric view, a 3D projector 100 that includes a base assembly 110, a yoke assembly 120, and a payload assembly 130. In most cases, the base assembly 110 is stationary relative to its surroundings. The yoke assembly 120 and the payload assembly 130 together rotate about an azimuth axis 140 coupled to the base assembly 110. The payload assembly 130 further rotates about a zenith axis 145 coupled to the yoke assembly 120. One or more beams of light are projected through window 132 of the payload assembly 130.

Figure 2:
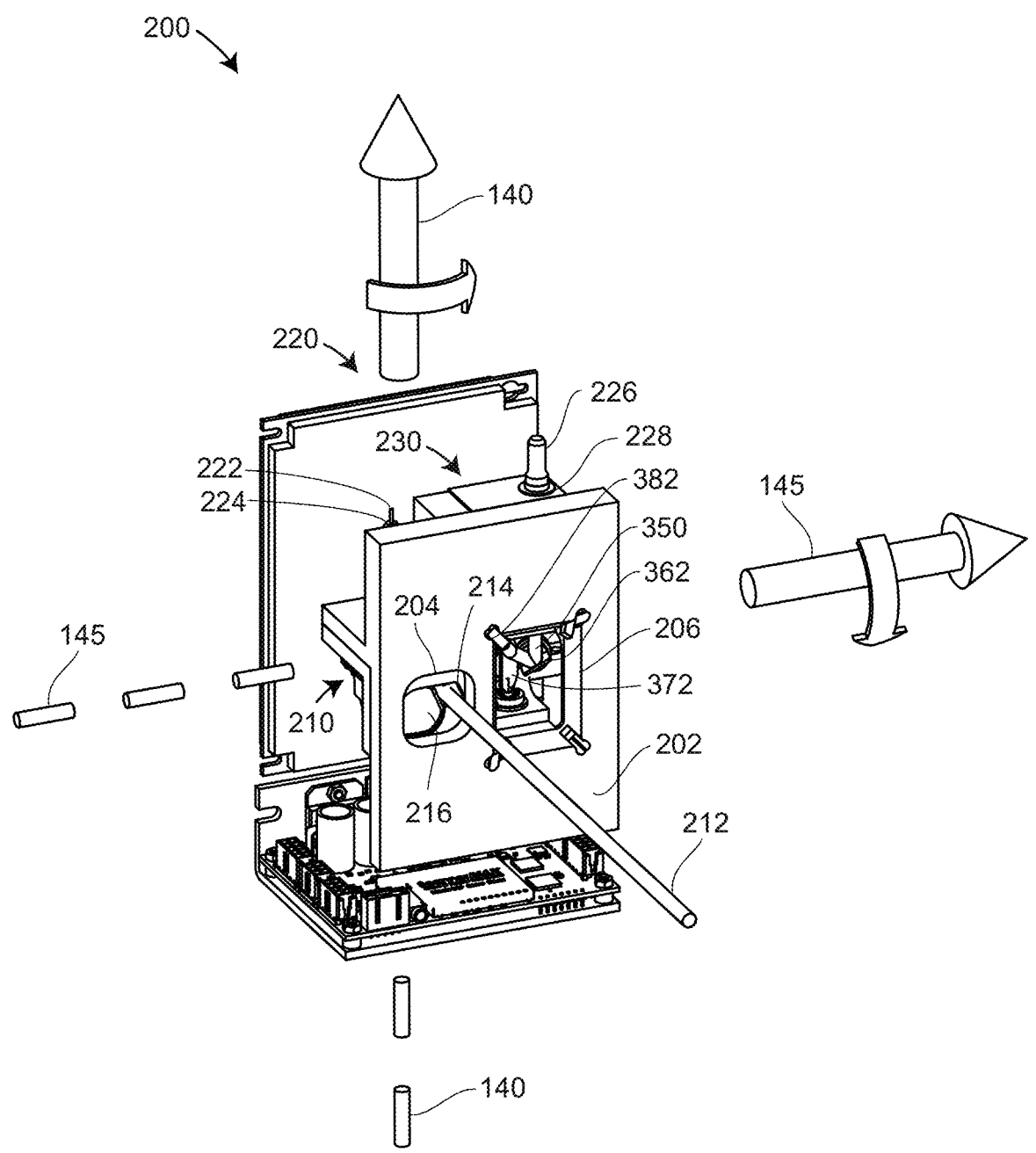
FIG. 2 is an isometric view of an assembly within the 3D projector according to an embodiment of the present disclosure.

FIGS. 2-5 are partial isometric views of assemblies within the 3D projector 100. In the ideal case, the azimuth axis 140 and the zenith axis 145 shown in FIG. 2 are mutually perpendicular and lie in a common plane. The ideal common point of intersection of the azimuth axis 140 and the zenith axis is referred to as the gimbal point. The assembly 200 of FIG. 2 rotates about the gimbal point according to the angles of rotation of the assembly 200 about the azimuth axis 140 and the zenith axis 145.

FIG. 2 shows a front mounting plate 202 having a first access aperture 204 and a second access aperture 206. The window 132 shown in FIG. 1 covers both access apertures 204, 206. A rangefinder 210 shown in FIG. 2 and FIG. 3 emits a beam of light 212 out of a rangefinder exit aperture 214 onto objects in the environment. The beam of light 212 reflects off an object point in the environment, returning to an entrance aperture 216 of the rangefinder 210. In an embodiment, the returning light is detected and processed by electronics within the rangefinder 210 to determine a distance from the rangefinder 210 to the object point. In an embodiment, the beam of light 212 in FIG. 2 is a visible beam of light such as a red laser light. In an embodiment, the beam of light 212 passes through the gimbal point and is perpendicular to the common plane of the azimuth axis 140 and the zenith axis 145. In an embodiment, the beam of light 212 is generated by a laser located within the rangefinder.

Figure 3:
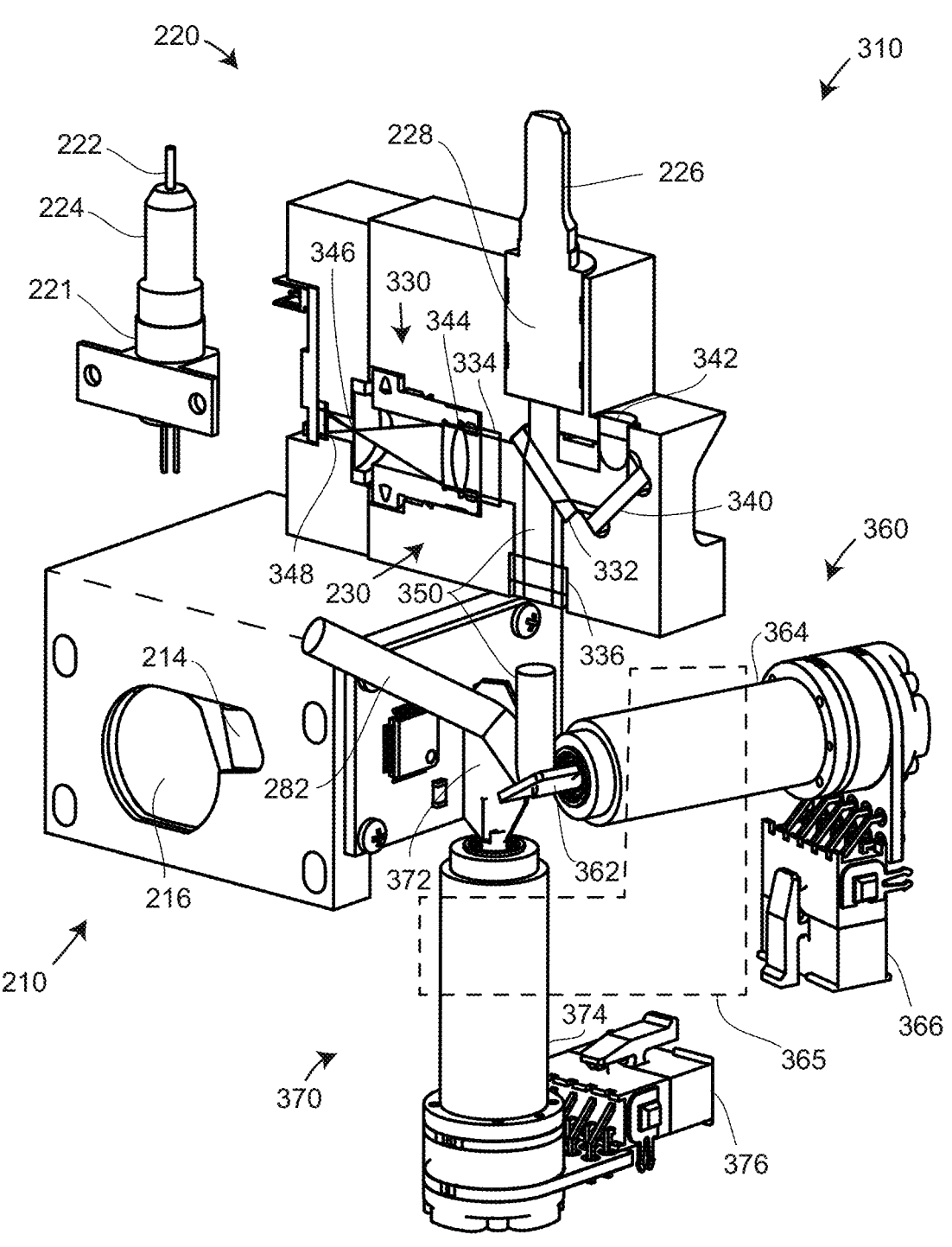
FIG. 3 is partly an isometric view and partly a sectional view of an assembly within the 3D projector according to an embodiment of the present disclosure.

As shown in FIG. 3, the beam of light 350 reflects off upper galvanometer mirror 362 and lower galvanometer mirror 372 before passing through the second access aperture 206 and the second window 132 as beam of light 282. The beam of light 350 may pass out of the window 132 as the beam 282 or the beam of light 350 may reflect off one of the small compensation mirrors 270A, 270B, 270C, 270D shown in FIGS. 2, 7A, 7B, as explained further herein below. In an embodiment, the beam of light 350 is a visible beam of light such as green laser light.

FIGS. 2-5 further show a beam emitting system 220 having a having a laser 221, an optical fiber 222, optical connectors 224, 226, and a lens collimating assembly 228. Light from the laser 221 passes through the optical fiber 222 and collimating lens assembly 228 into an optics directing assembly 230. FIG. 3 shows cross-sectional views of the fiber connector 226, the optics directing assembly 230, the collimating lens assembly 228.

Figure 4:
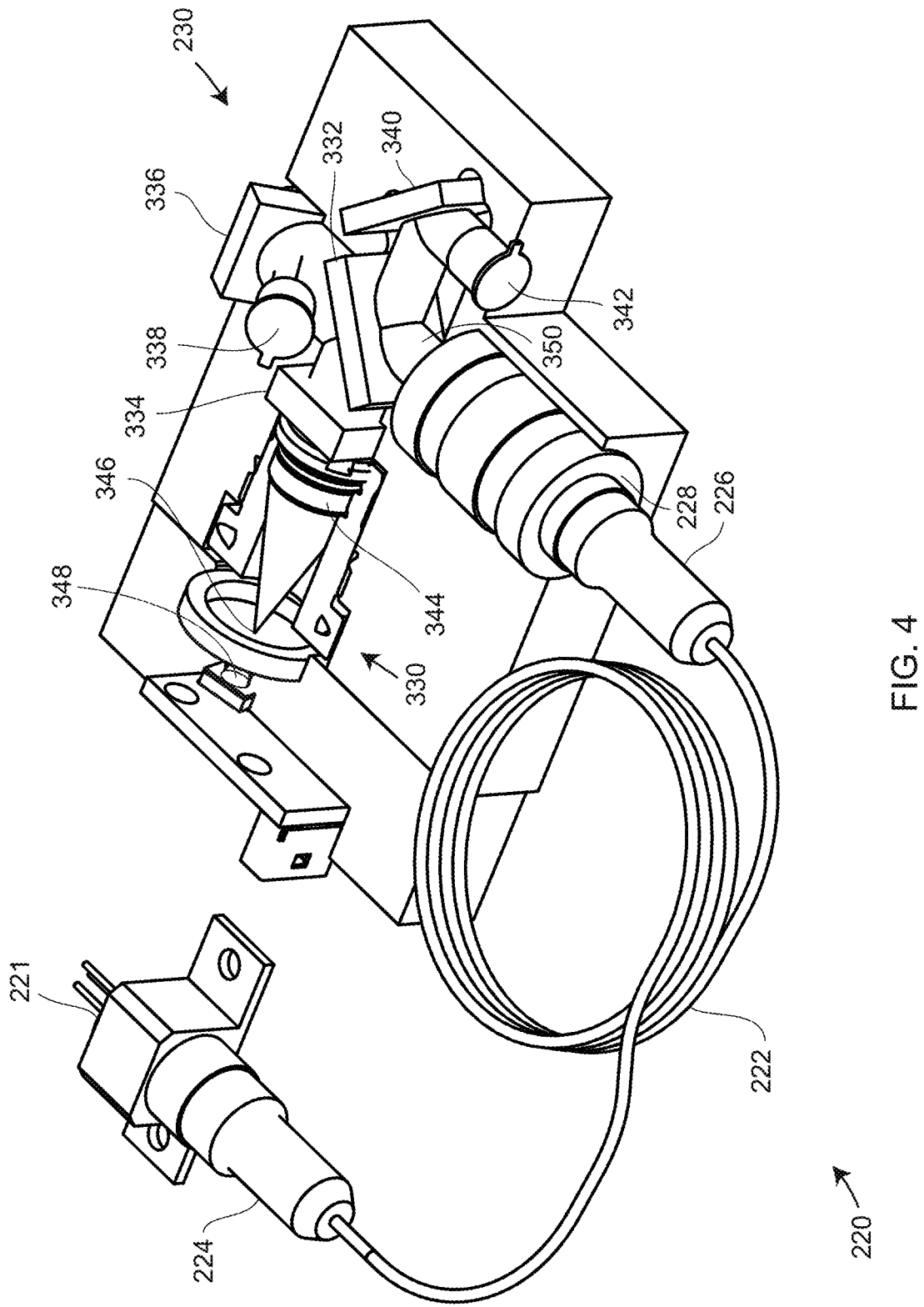
FIG. 4 is a view showing elements and beam paths of the 3D projector according to an embodiment of the present disclosure.
Figure 5:
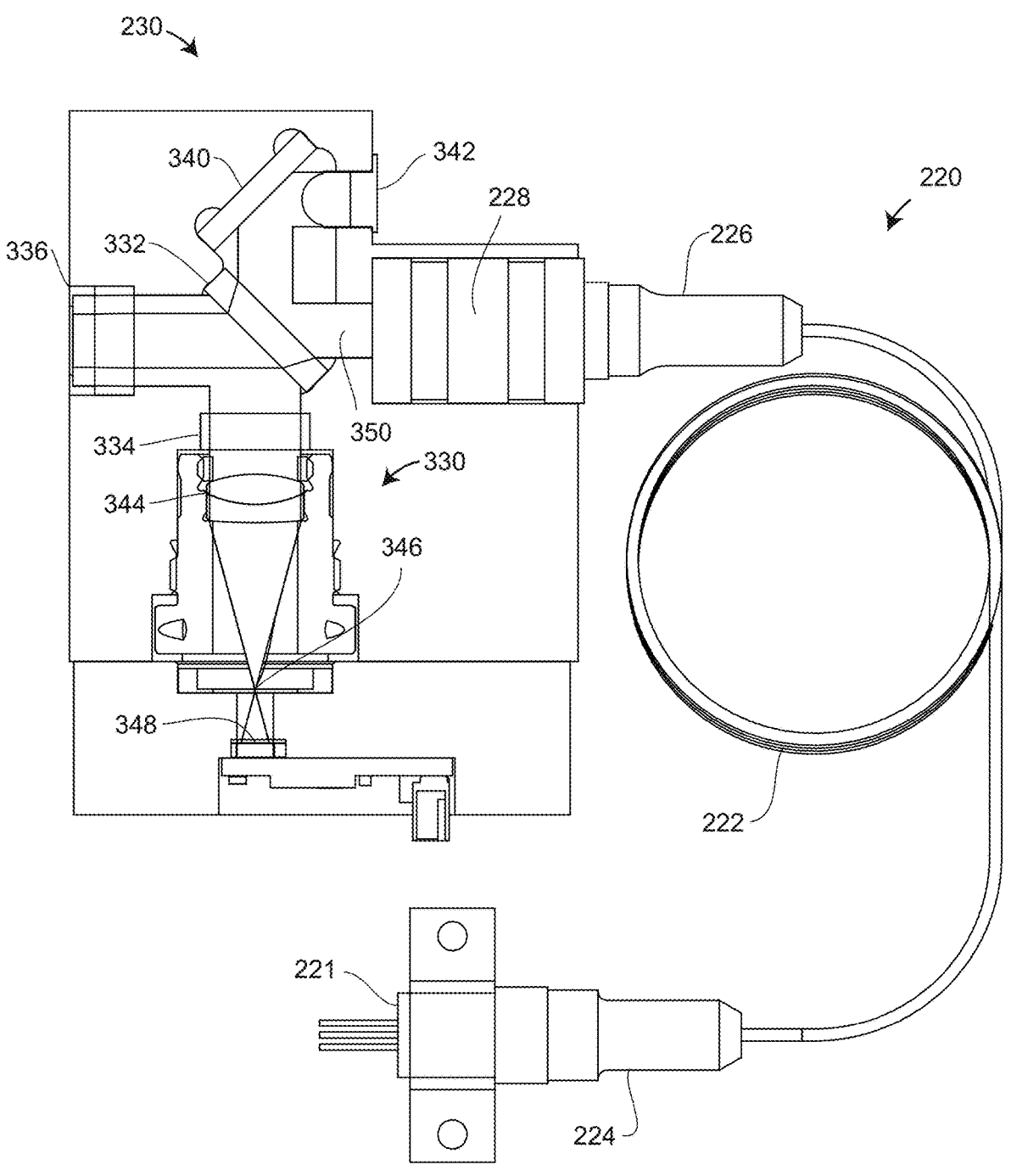
FIG. 5 is partly a top view and partly a top sectional view of elements within the 3D projector according to an embodiment of the present disclosure.

As shown in FIGS. 3-5, elements included within the optics directing assembly 230 further include beam splitter 332, output beam splitter 336, optical laser safety power detector 338, folding mirror 340, optical power control detector 342, and the sensitive scanning detector assembly 330. The sensitive scanning detector assembly 330 comprises an optical bandpass filter 334, a focusing lens assembly 344, a spatial filter 346, and an optical detector 348. The optical bandpass filter 334 blocks background light outside a relatively narrow range of wavelengths near that of the laser 221. The optical bandpass filter 334 blocks bright background light common in construction environments, for example. The focusing lens assembly 344 focuses light to a relatively small spot sized to fit through a relatively small aperture hole in the spatial filter 346. The optical detector 348 is selected for high sensitivity and relatively fast temporal response. The combination of elements in sensitive scanning detector assembly 330 provides relatively sensitive, accurate, and fast measuring capability under difficult environmental conditions. FIGS. 3-5 also show the paths 350 of the branching laser beam as it travels through the optics directing assembly 230.

In an embodiment illustrated in FIG. 3, when the laser beam 350 emerges from the output beam splitter 336, it strikes the upper galvanometer mirror 362, then the lower galvanometer mirror 372, afterwards passing as a beam of light 282 out of the window 132 of the payload assembly 130. Galvanometer assembly 360 includes galvanometer mirror 362, galvanometer motor 364, and galvanometer electrical connector 366. The galvanometer assembly 360 further provides information on the angle of rotation of the galvanometer mirror 362. Galvanometer assembly 370 includes galvanometer mirror 372, galvanometer motor 374, and galvanometer electrical connector 376. The galvanometer assembly 370 further provides information on the angle of rotation of the galvanometer mirror 372.

In an embodiment, a galvanometer system 310 includes the galvanometer assembly 360, the galvanometer assembly 370, the beam emitting system 220, the optics directing assembly 230, and a galvanometer mounting assembly 365. The galvanometer mounting assembly 365 is a metal structure used to combine the galvanometer assemblies 360, 370 into a rigid structure. In FIG. 3, the galvanometer assembly 365 is represented with dashed lines to avoid covering the elements of the galvanometer assemblies 360, 370. Further views of the galvanometer assembly 365 are shown in FIGS. 7A, 7B, 8A, 8B.

Figure 6:
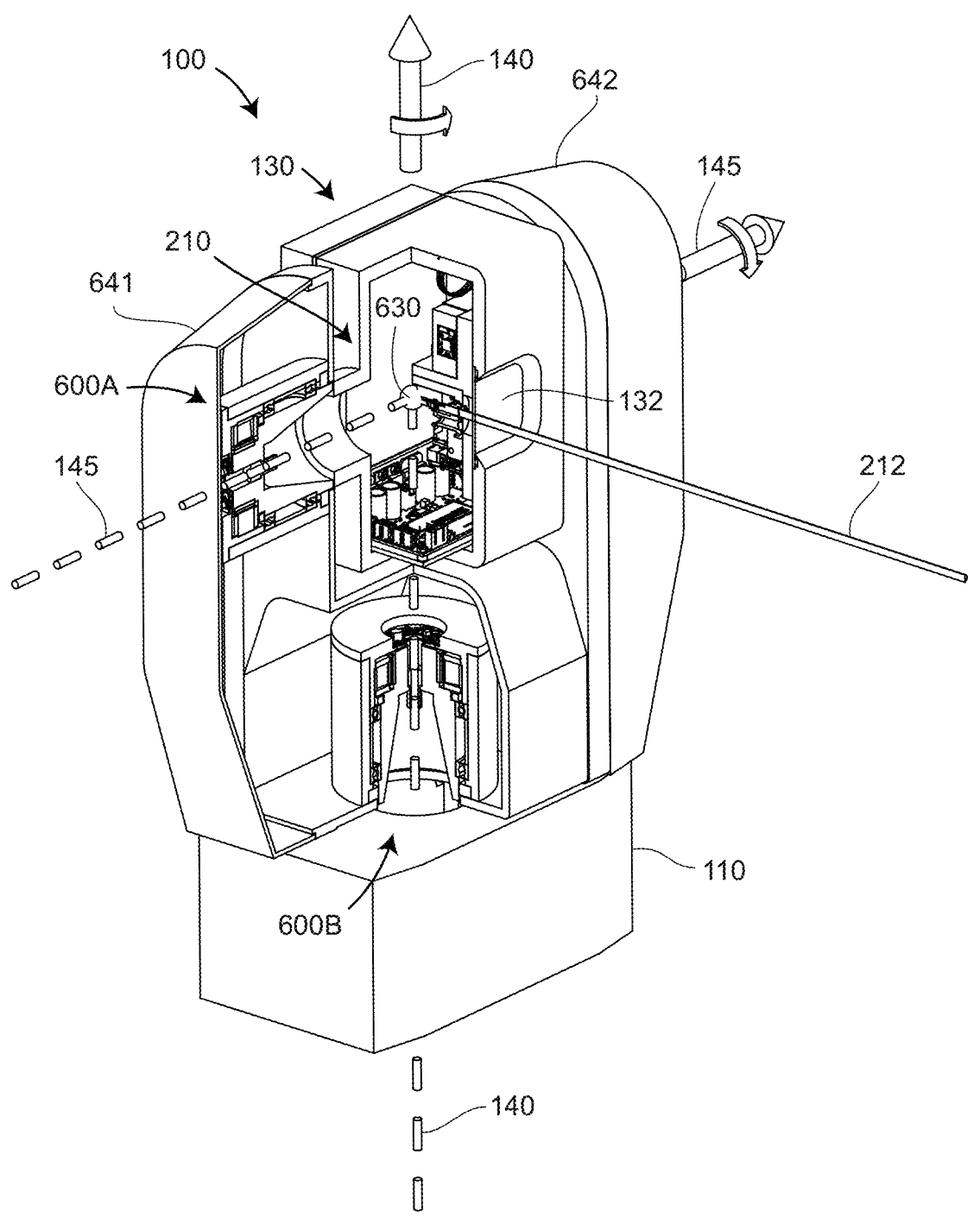
FIG. 6 is an isometric view, partly cutaway, of the 3D projector according to an embodiment of the present disclosure.

FIG. 6 is a cutaway isometric view of the 3D projector 100. In the embodiment illustrated in FIG. 6, a motor-encoder assembly 600A is mounted on the zenith axis 145, and a similar or identical motor-encoder assembly 600B is mounted on the azimuth axis 140. In the ideal case, the beam of light 212 emitted by the rangefinder 210 intersects the azimuth axis 140 and the zenith axis 145 at a single gimbal point 630, which in the ideal case is also the mechanical center of rotation. As shown in FIG. 3, the beam of light 282 from the galvanometer projecting system passes to the right side of the beam of light 212 from the rangefinder 210 (when viewing the 3D projector 100 from the front). In FIG. 6, protective covers 641, 642 are removable.

Figure 17:
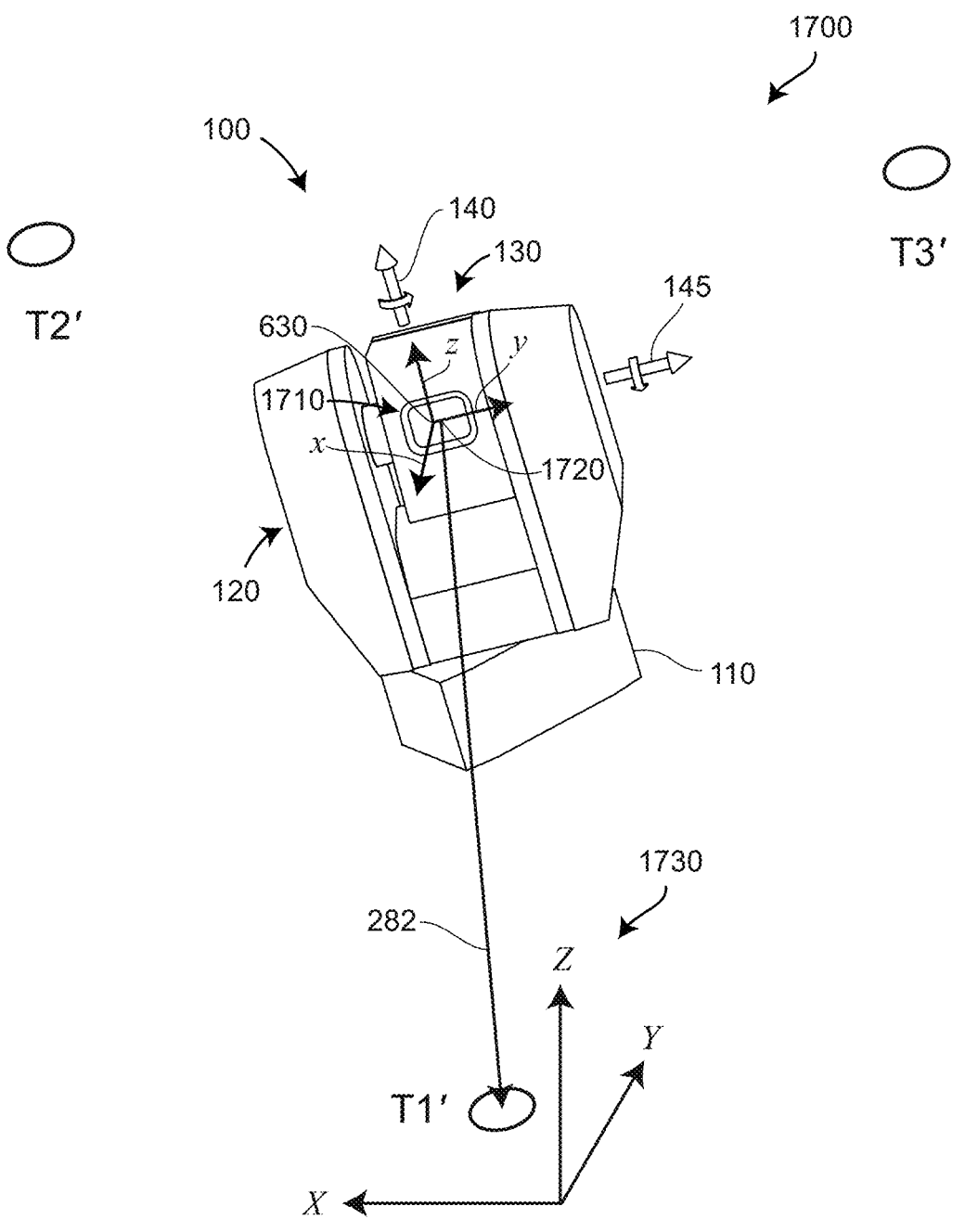
FIG. 17 is an isometric drawing showing a three frames of reference relevant for a 3D projector—a world reference frame, a base reference frame, and a payload reference frame according to an embodiment of the present disclosure.

FIG. 17 shows a system 1700 that includes the 3D projector 100 having the payload assembly 130. In an ideal case, the payload assembly 130 includes a payload coordinate system 1710 with three orthogonal axes x, y, z having a common origin at the gimbal point 630. In this case, the payload y axis is aligned to the zenith axis of rotation 145, and the x axis is aligned to the projected beam of light 212. The z axis is perpendicular to the x and y axes of the payload. The azimuth rotation axis 140 corresponds to a primary rotation axis of the yoke assembly 120. The base 110 is fixed with respect to rotations about the azimuth axis 140 and the zenith axis 145. The beam 282 from the galvanometer system 310 emerges from a point of reflection 1720 at the surface of the lower galvanometer mirror 372. As shown in FIG. 2 and FIG. 3, the point 1720 is to the right of the origin point 630 in the view of FIG. 17. In an embodiment, the galvanometer beam 1720 is projected onto each of three anchor points T1', T2', and T3'. A method for doing this projection is described herein below in reference to FIGS. 19A, 19B, 19C, 19D, 19E. The coordinate system 1730 is the frame of reference of the world coordinate system, also known as the object coordinate system. This is the frame of reference in which coordinates are given in the CAD model.

Figure 7B:
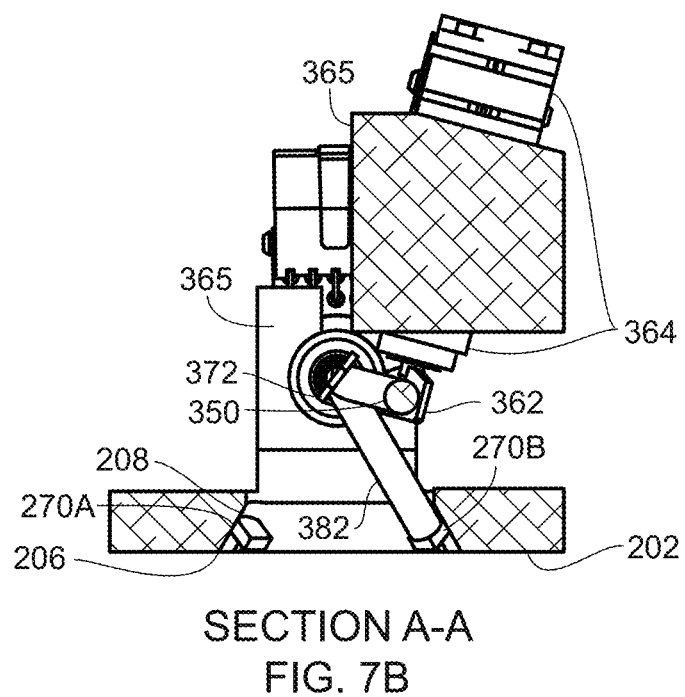
FIGS. 7A, 7B are a front view and a cross-sectional view, respectively, of an axis assembly of the 3D projector according to an embodiment of the present disclosure.
Figure 7A:
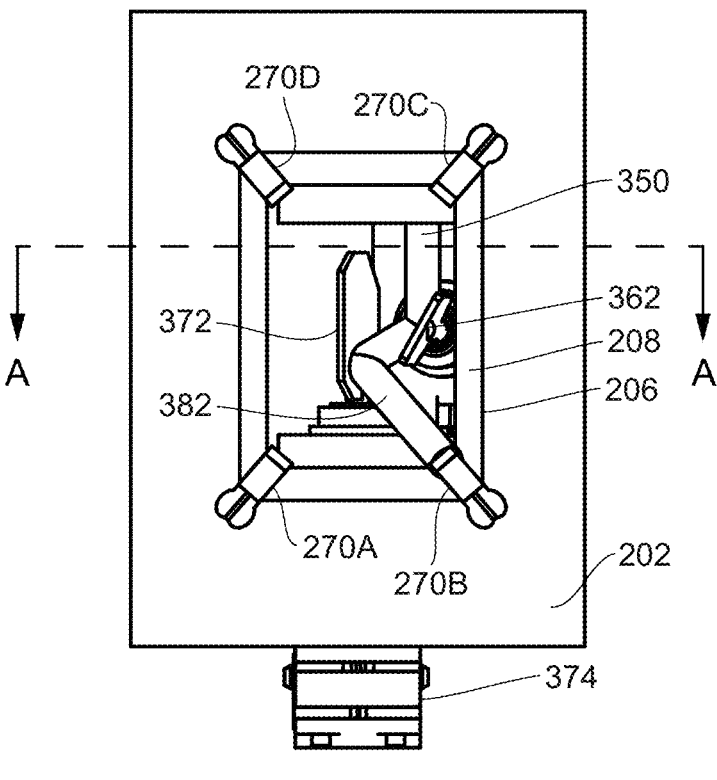

FIG. 7A is a front view of a portion of the front mounting plate 202 that includes the second access aperture 206 and related components. Around the edge of the second access aperture 206 is an angled bezel 208. Flat pads are machined into the four corners of the bezel 208 and small compensation mirrors 270A, 270B, 270C, 270D are epoxied onto the flat pads. The beam of light 350 first reflects off the upper galvanometer mirror 362 and then off the second galvanometer mirror 372. After reflecting off the galvanometer mirrors 362, 372, the emerging beam 382 arrives at the mirror 270B in the example illustrated in FIG. 7A. The angle of the mirrors 362, 372 are set to retroreflect the beam 382 back on itself. This procedure is used as needed to obtain compensation parameters to improve angular steering accuracy of the galvanometer assembly, as discussed further herein below. A portion of the galvanometer motor 374 for the lower mirror 372 can be seen in FIG. 7A below the front mounting plate 202.

FIG. 7B is a cross-sectional view A-A of the assembly of FIG. 7A. The front mounting plate 202, second access aperture 206, and bezel 208 are all visible in cross section. The compensation mirrors 270A and 270B can also be seen. The cross-sectional view A-A of FIG. 7B is a top view. The beam 350 can be seen traveling downward, reflecting off the mirrors 362, 372, before the beam 382 reaches the mirror 270B. The galvanometer motor 364 is clamped in place with a portion of a galvanometer mounting assembly 365.

Figure 8B:
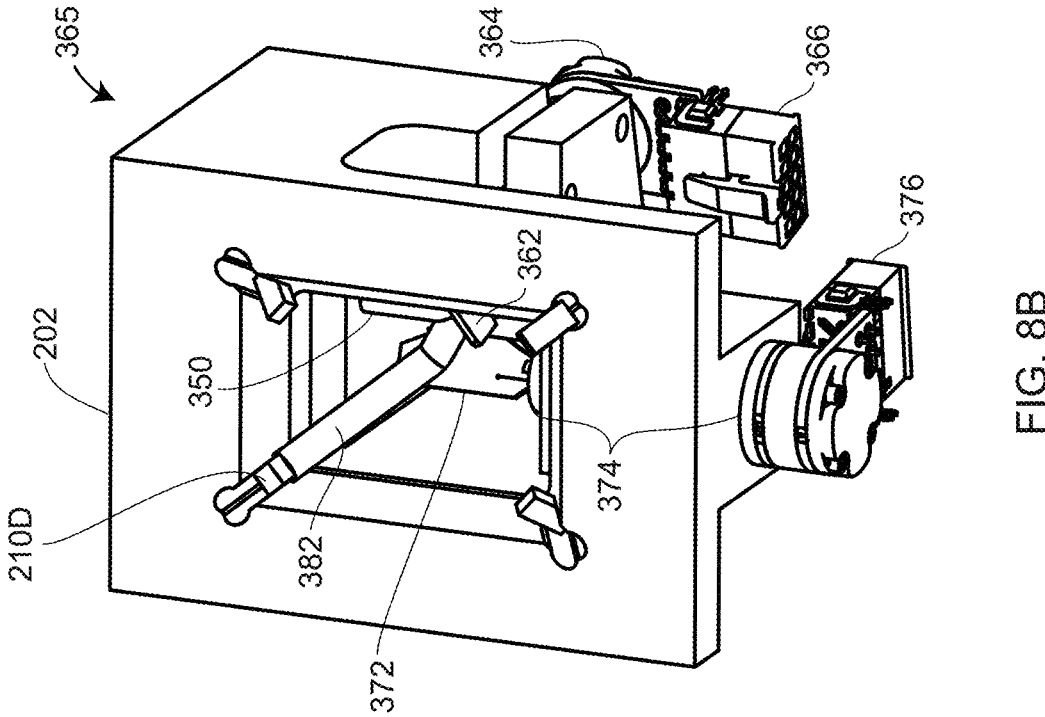
FIGS. 8A, 8B are isometric views of a front mounting plate and galvanometer mounting assembly according to an embodiment of the present disclosure.
Figure 8A:
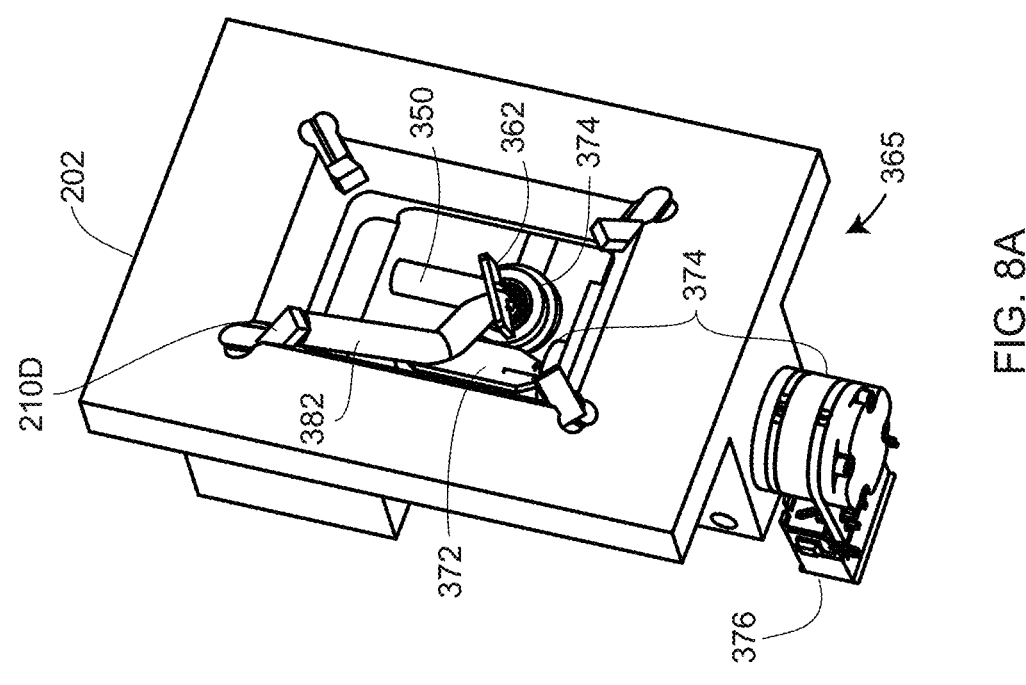

FIG. 8A and FIG. 8B are perspective views of the elements shown in FIGS. 7A, 7B. The beam 350 travels downward, reflecting first off the upper galvanometer mirror 362 and the lower galvanometer mirror 372 before arriving at the small compensation mirror 270D. The galvanometer mirror 372 is larger than the galvanometer mirror 362. Note that the beam 382 strikes the bottom of the galvanometer mirror 372 before traveling to the lower compensation mirror 270B, while the beam 382 strikes the top of the galvanometer mirror 372 before traveling to the upper compensation mirror 270D. The relatively large size of the lower galvanometer mirror 372 enables the beam to be directed to relatively large angles up, down, right, or left. Consequently, the beam 382 may reflect off any of the compensation mirrors 270A, 270B, 270C, 270D without reducing the angular projection region of the galvanometer projection system, which is more than +/−30 degrees in any direction. Portions of the galvanometer motor 374 for the lower mirror 372 and of the galvanometer motor 364 for the upper mirror 362 can be seen in FIG. 8A and FIG. 8B. In addition, the galvanometer electrical connector 376 can be seen in FIG. 8A and FIG. 8B, and the galvanometer electrical connector 366 can be seen in FIG. 8B.

Figure 9:
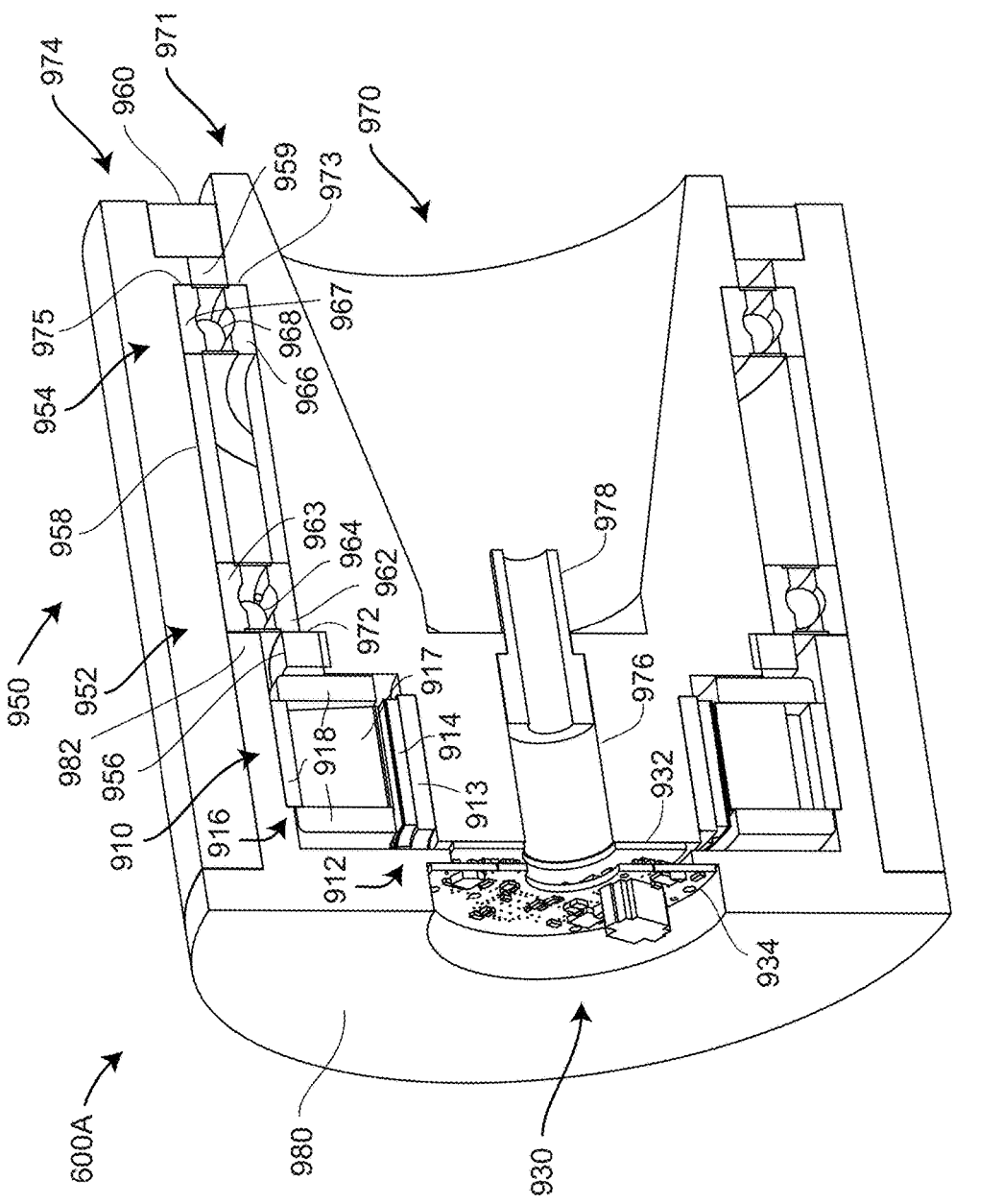
FIG. 9 is an isometric cross sectional view of a motor-encoder assembly according to an embodiment of the present disclosure.

FIG. 9 is a cross-sectional view of the motor-encoder assembly 600A, comprising a motor assembly 910, an angular transducer assembly 930, a bearing assembly 950, and structural elements 970. In an embodiment, motor assembly 910 includes a rotor assembly 912 and a stator assembly 916. Rotor assembly 912 includes a permanent magnet ring 913 and a ferromagnetic ring 914, both of which are securely affixed to and rotate with an inner shaft 971. The stator assembly 916 includes field windings 917 and ferromagnetic support elements 918, all of which are securely affixed to an extension 982. Electric current is applied to the field windings 917, which generate a magnetic field that is reinforced by the ferromagnetic support elements 918. The electric field generated in the stator assembly 916 interact with the magnetic field generated by the rotor assembly 912 to produce rotation of the rotor assembly 912 forward or backward at a desired rate relative to the stator assembly 916.

In an embodiment, the angular transducer assembly 930 includes an angular encoder. FIG. 9 shows elements of the angular encoder 930 including a grating disk 932 and a read-head circuit board 934. The read-head circuit board 934 includes one or more light sources (not shown) and one or more read heads (not shown). Each of the light sources on the read head circuit board emits light that travels to the grating disk, which in the encoder 930 is a reflective grating disk 932 that reflects light onto the optical detectors on the read head circuit board 934. The electrical signals produced by optical detectors in the read-head circuit board provide the information needed to determine the angle of rotation of an inner shaft 971. In other embodiments, the grating disk 932 is transmissive rather than reflective, and in still other embodiments, the positions of the grating disk 932 and the read-head circuit board 934 are reversed. In an embodiment, a plurality of read heads are included on the read-head circuit board 934 to improve accuracy of measured angles. In other embodiments, other types of angular transducers are used.

The bearing assembly 950 includes a first bearing 952, a second bearing 954, a first preloading nut 956, a bearing spacer 958, a sealing ring 959, and a second preloading nut 960. In an embodiment, the bearings are angular contact ball bearings. The first bearing 952 includes a first inner race 962, a first outer race 963 and a first collection of balls 964. The second bearing 954 includes a second inner race 966, a second outer race 967, and a second collection of balls 968. Structural elements 970 include the inner shaft 971, an outer casing 974, and a left support 980. Other structural elements include features to route electrical wires through the motor-encoder assembly 600A. These include a hole in grating disk 932, a hole in the read-head circuit board 934, a bore hole 976, and a hole in an insert 978.

The first inner race 962 and the second inner race 966 sit against the inner shaft 971. The first outer race 963 and the second outer race 967 are separated by the bearing spacer 958. The sealing ring 959 prevents lubricant from escaping the bearing assembly. The second preloading nut 960 pushes a lip 975 of the outer casing 974 against the second outer race 967 on the right. An extension 982 of the left support 980 pushes on the first outer bearing 963 from the left. A lip 973 of the inner shaft 971 pushes against the second inner race 973. The first preloading nut 956 pushes against a lip 972 of the inner shaft 971 as well as directly on the first inner race 962. The positions of the lips 972, 973 are set by rotation of the first preloading nut 956. Hence the first preloading nut 960 and the second preloading nut 962 determine the preload applied to the first bearing 952 and the second bearing 954. Electrical wires are routed through structural element holes in grating disk 932, read-head circuit board 934, bore hole 976, and insert hole 978.

Figure 10:
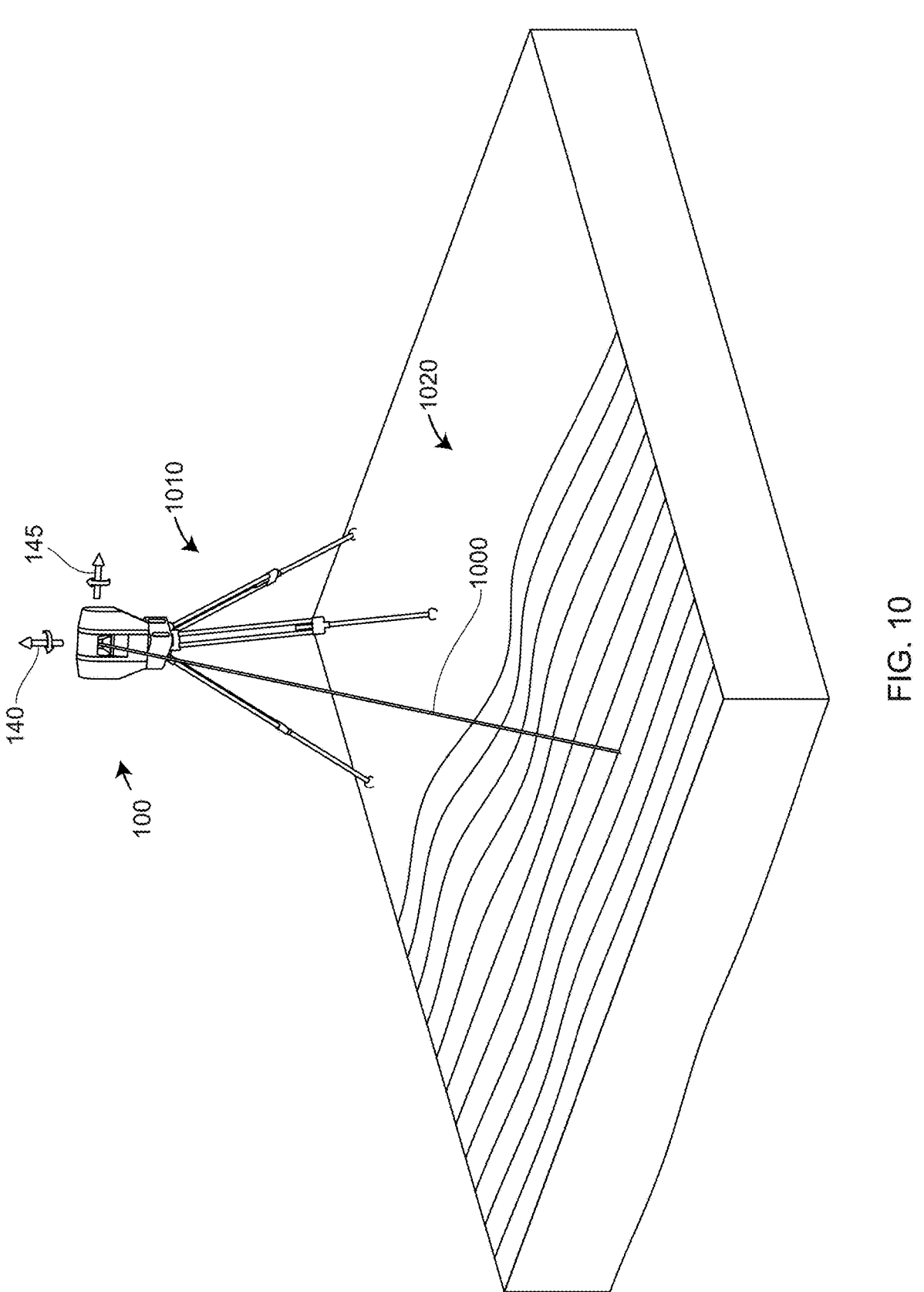
FIG. 10 is an isomeric view of a 3D projector on a tripod projecting a beam of light into an environment according to an embodiment of the present disclosure.

FIG. 10 is a perspective view of a 3D projector 100 mounted on a tripod 1010. Although a tripod is used in this example, any type of mounting element may be used—for example, an instrument stand or any sort of mounting surface in an area of interest. The 3D projector 100 projects a beam of light 1000, which may be a beam of light 212 from the rangefinder 210 or a beam of light 282 from the galvanometer system 310. In embodiments further described herein, the beam of light 212 from the rangefinder is ordinarily used to measure a distance to a point given in a CAD drawing. By measuring the distance to the projected point, any discrepancy between the as-designed 3D coordinates and the actual 3D coordinates of that point will become apparent. In further embodiments, the beam of light 282 from the galvanometer system 310 is used for two purposes. A first purpose is to accurately determine the pose of the 3D projector 100 in relation to markers that are measured in 3D by a relatively accurate instrument such as a total station. A second purpose is to project with the galvanometer system 310 an illuminated pattern indicating where a defined construction operation is to be performed or a certain item is to be installed. For example, a projected pattern may indicate a desired placement for a stud wall on a floor.

Figure 11:
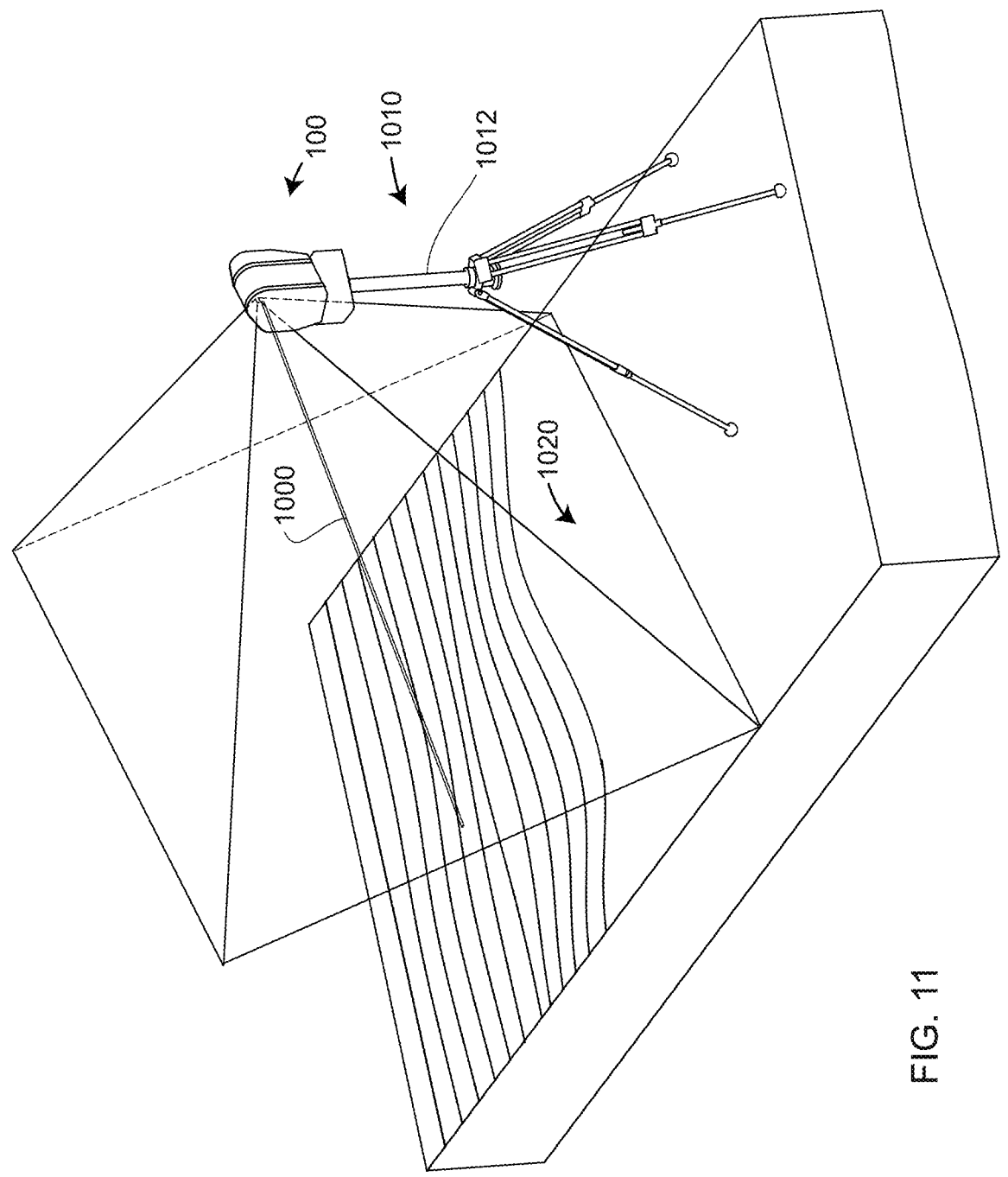
FIG. 11 is an isometric view of the 3D projector raised on a center extension of a tripod for projecting a beam of light into an environment according to an embodiment of the present disclosure.

FIG. 11 is a perspective view of the 3D projector 100 mounted on the tripod 1010 with a center extension 1012 of the tripod 1010 raised to increase the height of the 3D projector 100 from the floor. This raising of the 3D projector 100 has the advantage of more accurately determining the position along the floor where the glowing template is to be projected based on the distance measured by the rangefinder beam 212. The projection envelope 1020 indicates a range of movements possible with the galvanometer mechanism without rotation of the gimbal mechanism.

Figures 13A, 13B, 13C, 13D, 13E:
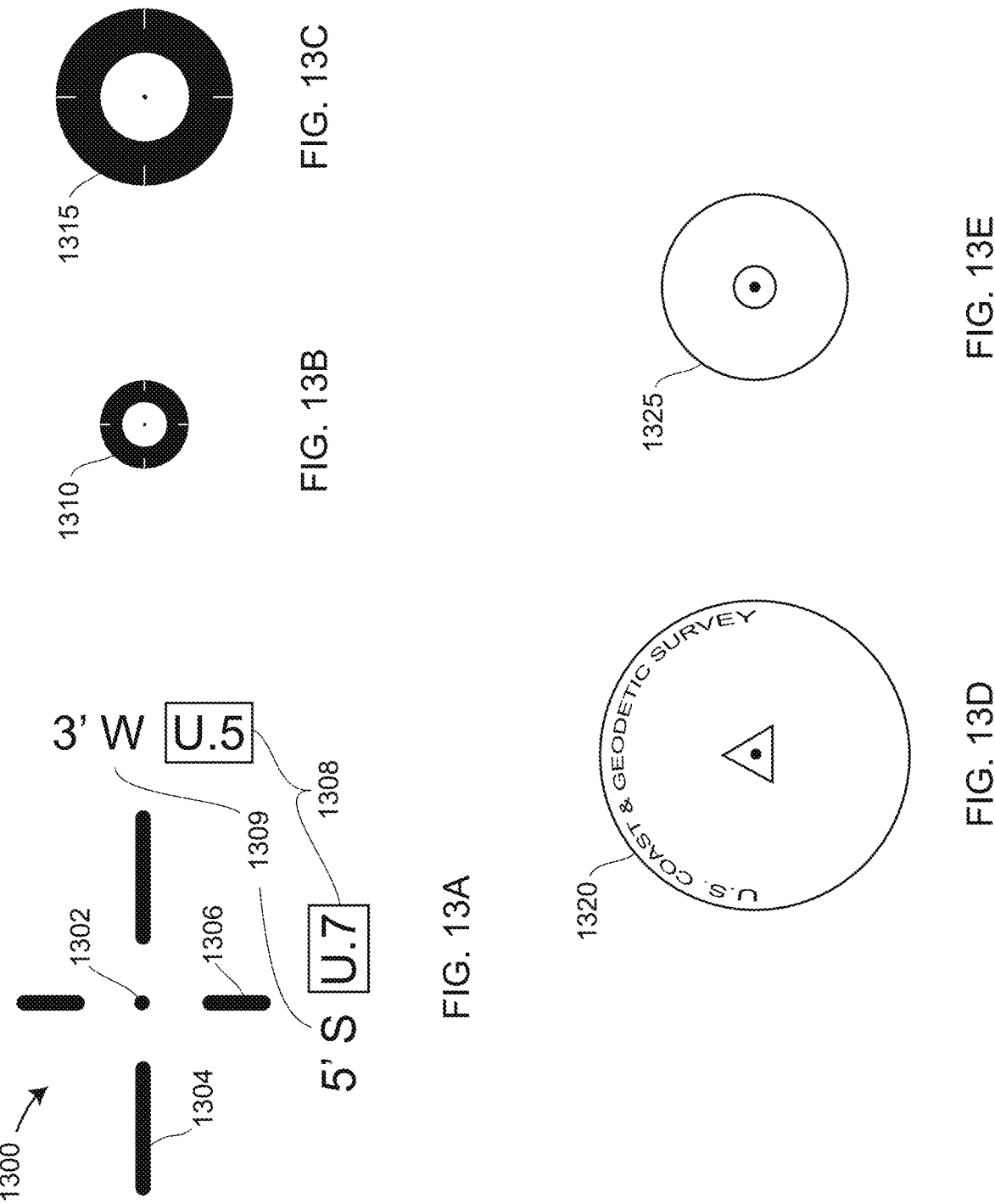
FIG. 13A is an illustration of a control point as it might be marked for use with a 3D projector according to one or more embodiments described herein.
FIGS. 13B, 13C are exemplary reflective targets that may be centered on control points for measurement with a 3D projector according to one or more embodiments described herein.
FIG. 13D is a control point marker that may be used by the U.S. Coast and Geodetic survey in the preparation of surveying maps.
FIG. 13E is another type of control point marker that may be used in surveying and construction.

FIG. 12 illustrates some elements that may be performed according to a method 1200 that uses a 3D scanner 100 to assist in construction. In block 1202, which overall refers to creating a layout plan, a user imports a CAD (as designed)

model of the building plans, identifies anchor points in the CAD model, identifies desired projection points in the construction project, and optionally selects an order of projection. In preparation for construction of a new building, a surveyor will typically use a total station to measure control points placed at a plurality of points on a property. Such control points may start at a geographical level and be marked with control markers such as the marker 1320 shown in FIG. 13D. The control marker or control monument 1320 is an official marker of the U.S. Coast and Geodetic Survey. At intermediate sites for which a permanent marker is desired, a variety of marker types may be used and placed into hard-packed ground, for example. FIG. 13E shows an example of such a marker 1325. A total station is further used to transfer control points from the property onto a site on which a building will be constructed. For the case in which the construction project includes a concrete floor, the control points will typically be marked on the floor.

FIG. 13A shows an example of a collection of control marks 1300 made, for example, with a permanent marker on a concrete floor. A control point 1302 is a point having 3D coordinates indicated on the CAD model (drawing) and further having its 3D coordinates measured by a total station or similar instrument. For this type of measurement, a total station in combination with a prism pole is typically accurate to about ⅛ inch, which is around 3 mm. In the collection of control marks 1300 shown in FIG. 13A, horizontal crossing lines 1304 and vertical crossing lines 1306 point to the control point 1302. The crossing lines 1304, 1306 may correspond to control lines on the CAD drawing and may, for example, in addition be designated with control line designators 1308, for example, as U.5 and U.7. The crossing lines 1304, 1306 may further correspond to a predetermined distance and direction from a reference point on the CAD drawing, and this information marked as designators 1309, for example as 5'S (5 feet South) and 3' W (3 feet West). Because of the relatively high accuracy of the total station in setting out the control points and control lines, the measured control points are taken to be accurate reference points in constructing a building.

Block 1202 includes an element "identify anchor points in a CAD model." As explained herein above, the term control point as used in this application includes the category of control points measured by a total station or similar device according to 3D dimensions indicated on the CAD model. The term anchor points includes control points and further includes any stable reference feature measured in a different way. An example of such a stable reference feature would be a measurement of a building corner (three intersecting surface planes in a building) having 3D coordinates measured with a terrestrial laser scanner or a 3D projector 100 having accuracy equal to or better than a total station. Other anchor points may arbitrarily be placed on stable surfaces and measured to provide additional accurate reference points. For example, a target affixed to a stable wall may serve as anchor point. The term anchor target or anchor point target refers to a target that includes a mark indicating the location of a control point.

Another aspect of the method 1200, block 1202 is to identify desired projection points for each construction project. The term "projection points" as used here is synonymous with the term "glowing template points" used elsewhere in this document. These terms refer to points that reference a location in a construction step or a location on which a structure is to be mounted. For example, a collection of glowing template points may be projected onto a floor to indicate where a stud wall is to be affixed. Similarly, a single glowing template point might indicate where a hole is to be drilled into a wall. To ensure quality and speed of measurements on site, desired projection points on the CAD drawing may be selected off site. Such desired projection points may be selected with human assistance or without human assistance, for example, by using preset design rules or augmented reality (AR) methods. The order in which glowing template points are to be projected onto a job site is optionally also selected with human assistance or automated methods.

The method 1200 then proceeds to block 1204, which overall refers to preparing targets, a user optionally places reflective targets over anchor points, optionally places reflective targets on bipod stands, and optionally places reflective targets on stable walls. Although a 3D projector 100 can measure a wide variety of markings, including a reference point 1302 placed on a concrete floor as illustrated in FIG. 13A, the 3D projector 100 will obtain a more accurate reading by scanning a circular reflective targets such as, for example, the target 1310 in FIG. 13B or the target 1315 in FIG. 13C. Such targets may be conveniently placed over a reference mark 1302 using the crossing lines 1304, 1306 to center a circular target 1310 or 1315.

Figure 13G:
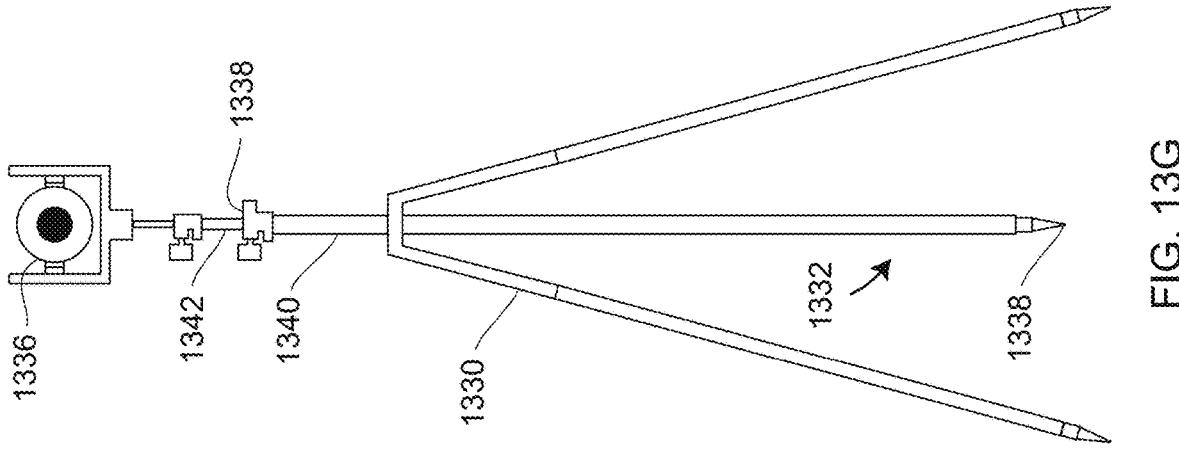
FIG. 13F, 13G are a cube-corner retroreflector and a flat retroreflector, respectively, mounted on a surveyor pole and bipod assembly according to an embodiment of the present disclosure.
Figure 13F:
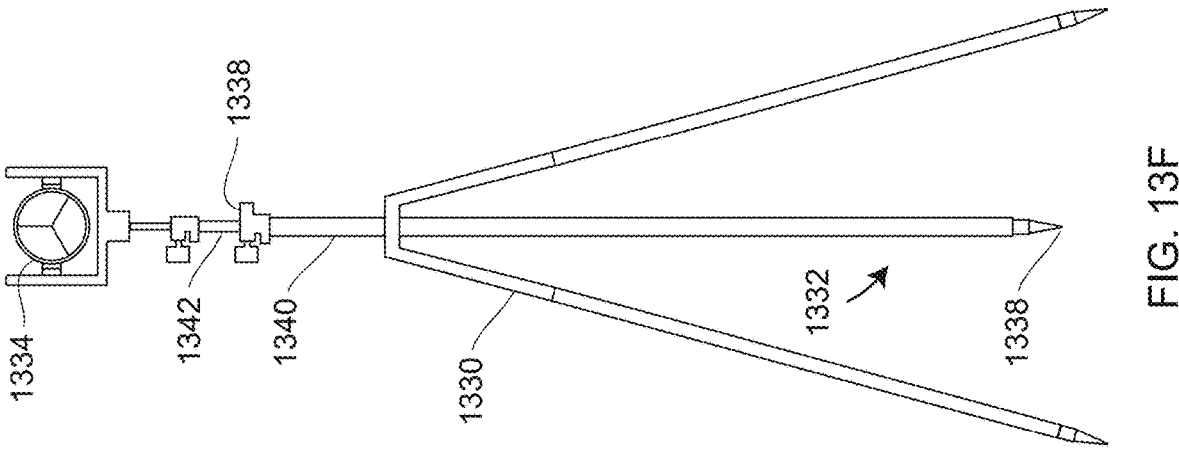

One of the aspects of block 1204 is optionally placing reflective targets on bipod stands. A bipod stand may optionally stabilize a pole that holds a reflective target serving as an anchor point. A bipod stand 1330 shown in FIGS. 13F, 13G is a two-legged structure mounted to the main leg of a surveyor pole 1332. Mounted to the top of the surveyor pole 1332 is a retroreflector such as a cube-corner retroreflector 1334 or a circular reflector 1336. In an embodiment, a spirit (bubble) level 1338 is also attached to the surveyor pole. In a further embodiment, the surveyor pole includes a first part 1340 and a second part 1342 having markings that enable the adjusted height of the reflecting element 1334, 1336 to be read off. In some cases, the surveyor pole further includes a sharp tip 1338 allowing the reflecting element 1334, 1336 to be accurately centered over control points.

Another aspect of block 1204 is optionally placing reflective targets on stable walls. An example of such a stable wall might be a poured concrete wall, for example. The anchor point could be identified with a reflective marker such as a marker 1310 in FIG. 13B or the marker 1315 in FIG. 13C. In another embodiment, an accurate 3D measuring device such a 3D projector 100 or a terrestrial laser scanner might be used to measure a point at the plane of intersection of three surfaces—for example, in the corner of a room. This is an example of an anchor point that may be established without the use of a target.

If the materials in the natural features being scanned are all similar in their reflectivities, it may be difficult to clearly distinguish the edges of the natural features. In this case, an option is to use the rangefinder 210 to measure the distance to points on each of the surfaces. It will take longer to scan surfaces using the rangefinder beam 212 than the beam of light 282 from the galvanometer assembly, but this is feasible if the rangefinder is accurate enough for the materials and distances being measured.

The method 1200 then proceeds to block 1206, which includes powering on and initializing the 3D projection device. Such initialization procedures may include performing different sorts of compensation procedures, as further discussed herein below. A further aspect of block 1206 is connecting the 3D projection device to a mobile computing device. Such a mobile computing device may be used as a user interface to display CAD models and collected data. In other cases, it is used to send commands to control the 3D projection device. In some cases, the mobile device is a mobile phone, while in other cases it is a computer tablet, portable computer, or computer monitor.

Another aspect of block 1206 is measuring each of three or more targets with the 3D projection device. In an embodiment, the 3D projection device is the 3D projector 100. An accurate way to locate anchor points is to use the galvanometer system 310 to find the center of each of anchor points. In an embodiment, each anchor point is marked with a reflective marker such as 1310 or 1315. Methods for finding the centers of anchor point targets using the galvanometer system 310 is discussed herein below with reference to FIGS. 13H, 13I, 13J, 13K, 13L, 13M. Further methods using a camera operatively coupled to the 3D projector to assist in finding the anchor point targets are discussed with reference to FIGS. 14A, 14B, 14C.

Figures 13H, 13I, 13J, 13K, 13L, 13M:
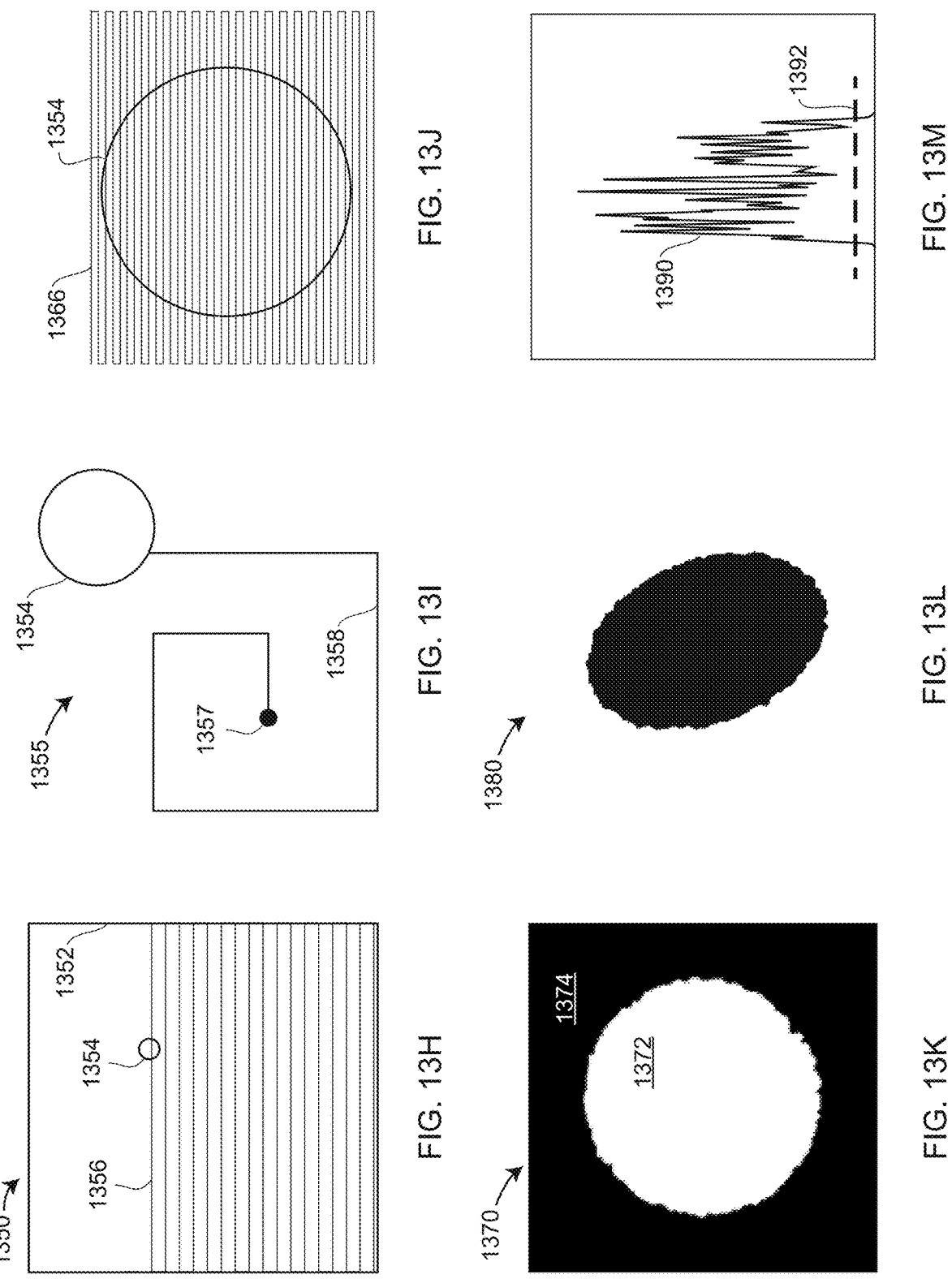
FIG. 13H illustrates projection of a glowing template in the shape of a box followed by a rapid raster scan to locate a target marker according to an embodiment of the present disclosure.
FIG. 13I illustrates a method for locating a target marker by performing a spiral search according to an embodiment of the present disclosure.
FIG. 13J is method for locating a center of a target marker by performing a raster scan that covers the surface of the target marker according to an embodiment of the present disclosure.
FIGS. 13K, 13L are illustrative raster scans of a reflective target marker as obtained from a laser beam aimed at the target from normal incidence and from angled incidence, respectively, according to an embodiment of the present disclosure.
FIG. 13M shows detected laser power truncated above a truncation level according to an embodiment of the present disclosure.

FIG. 13H shows a method 1350 in which the center of a reflective target 1354 is found by projecting a glowing box 1352 with the galvanometer system 310. An operator moves the glowing box over the target 1354, for example, using a mouse or a finger on a touch-screen display. The galvanometer system 310 then performs a rapid raster scan 1356 within the glowing box until the return signal increases markedly in intensity, which indicates that the marker 1354 has been encountered. The galvanometer system 310 then commences a finer raster scan using raster lines 1366 to encompass the marker 1354 as illustrated in FIG. 13J. In an embodiment, the center of the marker 1354 is taken to be the calculated marker centroid.

FIG. 13I shows an alternative method 1355 in which the operator uses a mouse, finger with touch screen, or similar method to direct the projected beam 282 from the galvanometer system 310 to a point 1357 near the target 1354. The 3D projector 10 then performs a search method such as a spiral search 1358 to move the beam until the it intercepts the marker 1354. The 3D projector 100 then commences a fine raster scan of the marker 1354 as shown in FIG. 13J to locate the center of the target 1354.

FIGS. 13K, 13L show images 1370, 1380, respectively, obtained from scanning the reflective target 1354 at normal and oblique incidence, respectively. The optical signal reflected from the target 1354 is detected with the sensitive scanning detector assembly 330. FIG. 13M shows an exemplary signal 1390 obtained for a single raster line moved across a reflective marker. The dashed line 1392 is a truncation level above any received levels are truncated to the level of the dashed line. In FIGS. 13K, 13L, the white regions 1372, 1382, respectively, correspond to the truncation level 1392, and the black levels 1374, 1384 correspond to levels below the truncation level, which are nearly zero for the sensitive scanning detector assembly 330.

As a supplement or an alternative to the method described in FIGS. 13H, 13I, 13J, 13K, 13L, 13M, a camera image sensor with flashing light source would provide a way to quickly locate reflective markers in the environment. Such a camera could be used to quickly locate an approximate angular direction to each of the reflectors in an environment. The procedures shown in FIGS. 13I, 13J, 13K, 13L, 13M could then be used to reduce or eliminate time for the user to move a glowing box 1352 over a target 1354 or to move a projected beam of light 1357 near the target 1354. In other cases, a camera would be capable of directly determining a center of the marker 1354 to an acceptable level of accuracy. In general, cameras do not provide the resolution or accuracy to provide the desired accuracy over the desired wide range of distances from the target. For example, in an embodiment, the galvanometer system 310 can project and measure from near the 3D projector to 50 meters away from the tracker with relatively high accuracy.

Figure 14A:
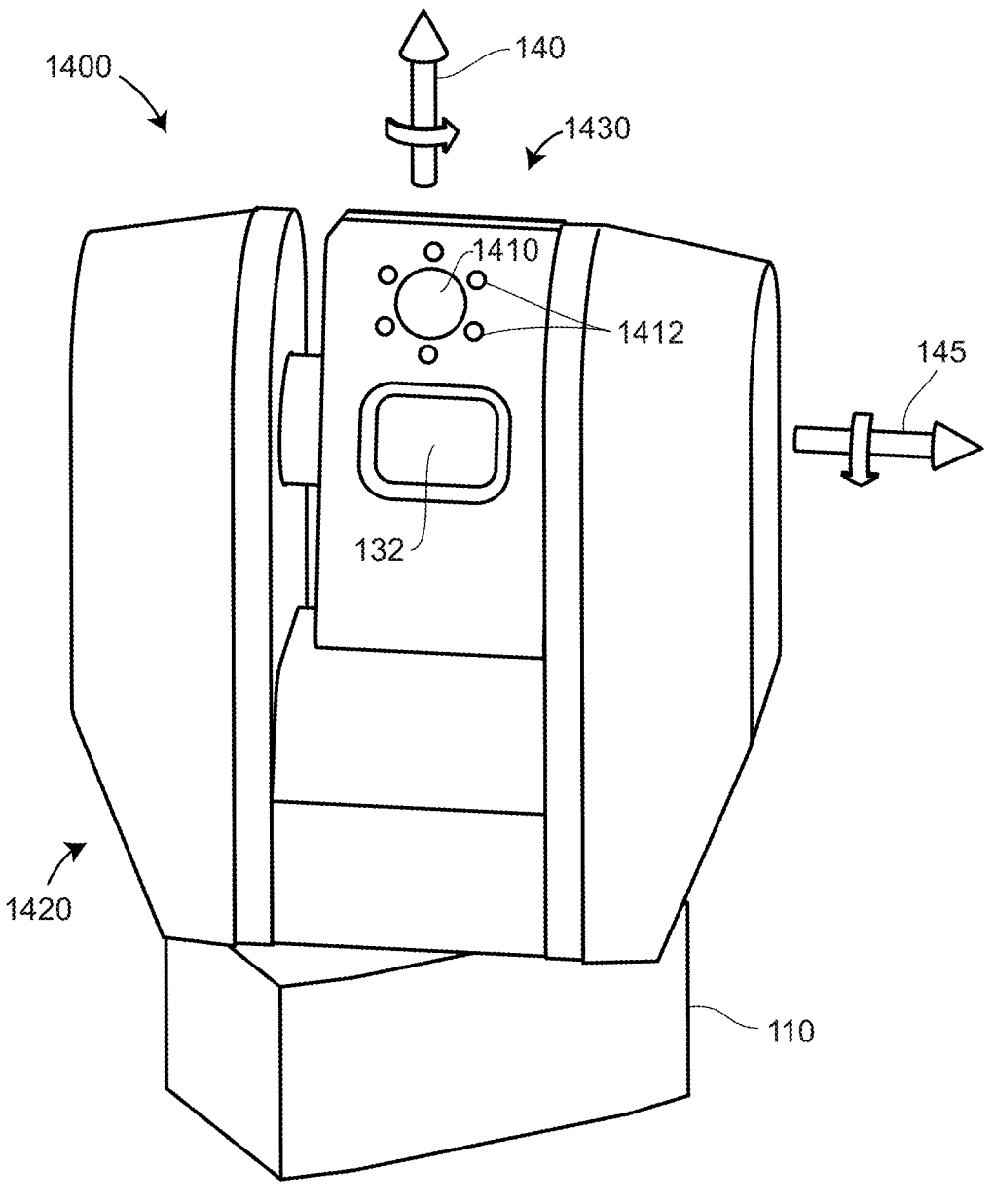
FIG. 14A is an isometric view of a 3D projector that further includes camera surrounded by flashing LEDs according to an embodiment of the present disclosure.
Figure 14B:
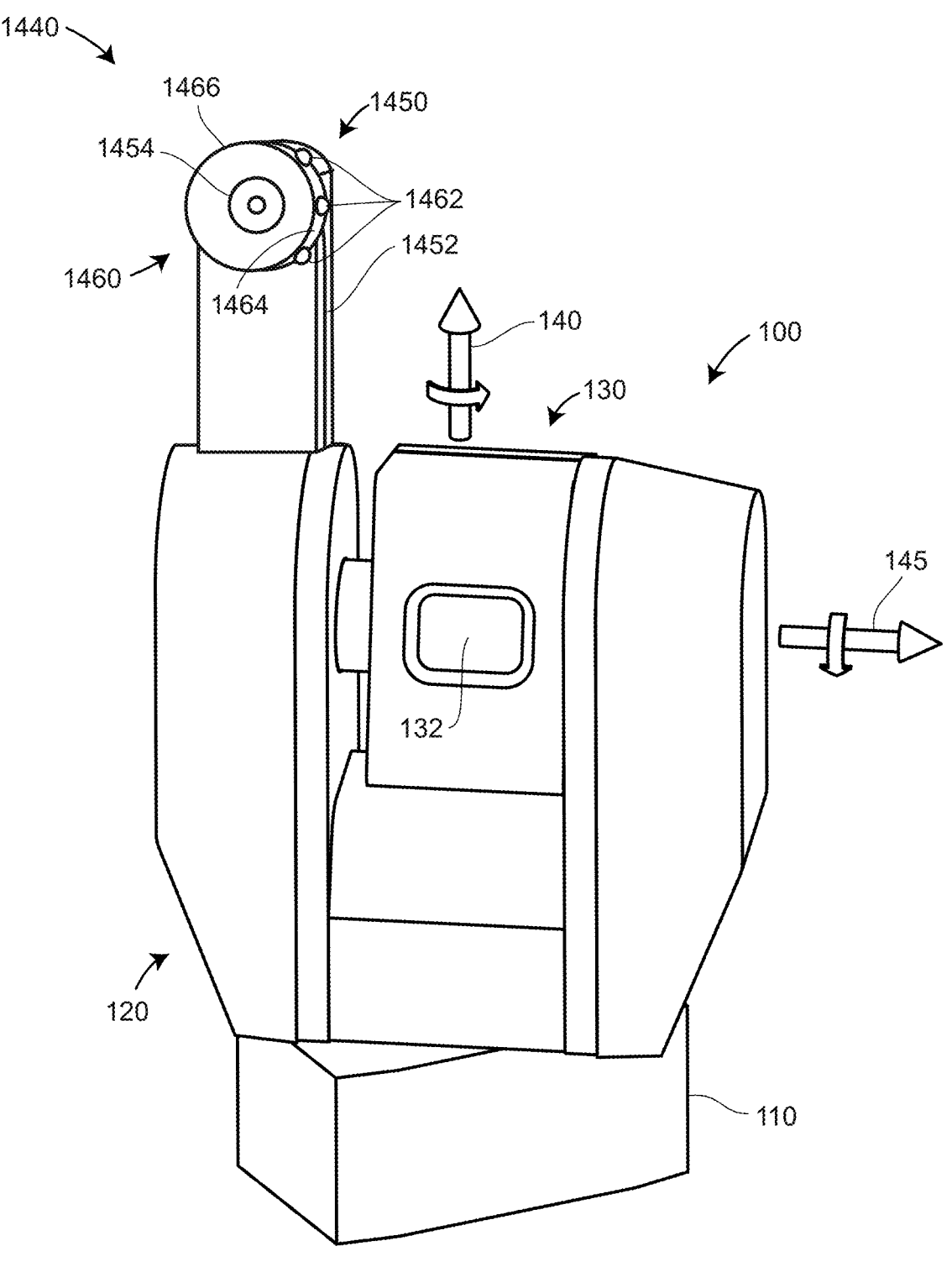
FIG. 14B is an isometric view of a 3D projector having a wide-angle camera and LEDs attached to the 3D projector according to an embodiment of the present disclosure.
Figure 14C:
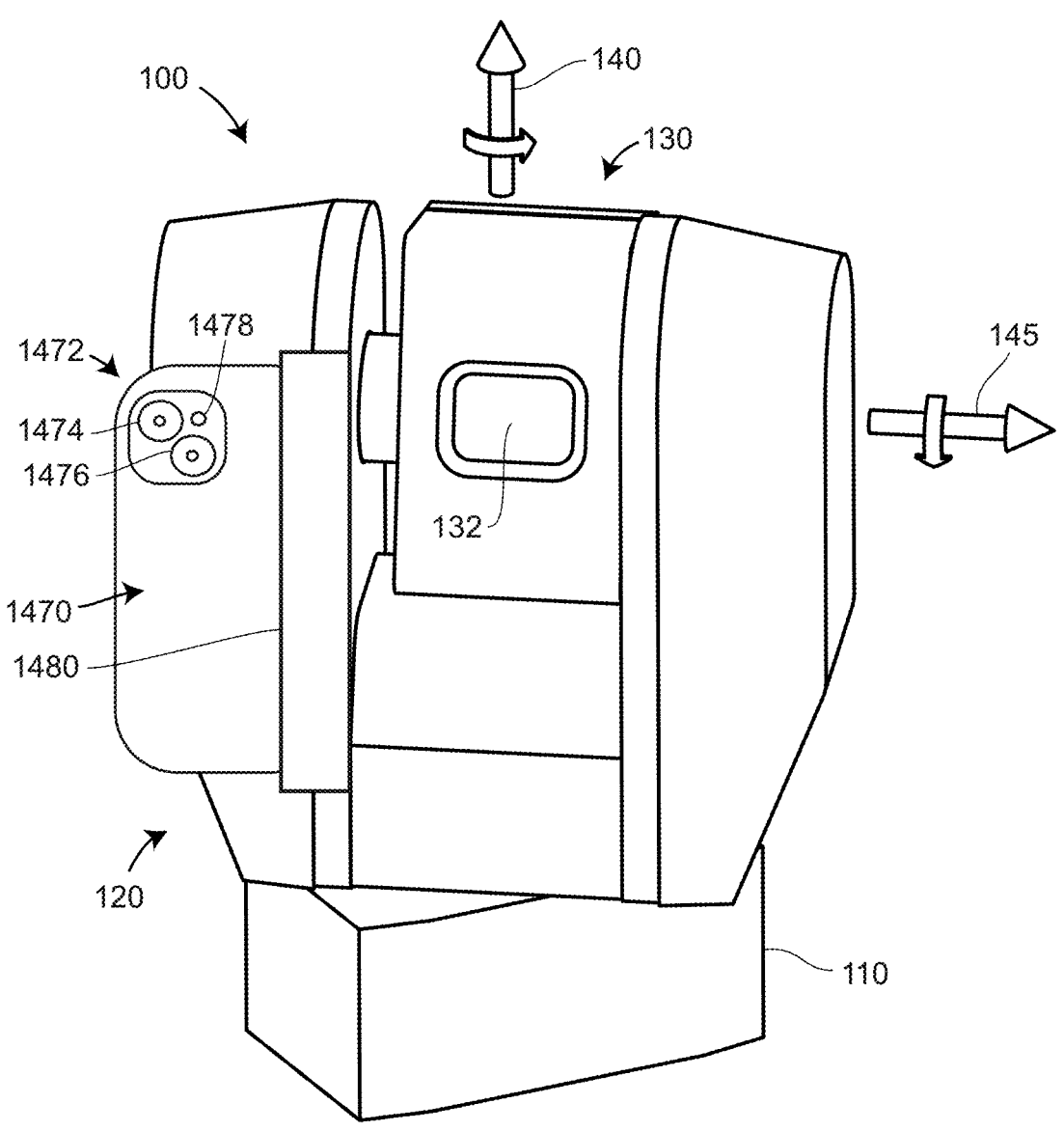
FIG. 14C is an isometric view of a 3D scanner that includes a mount that holds a mobile computing device that includes a wide-angle camera according to an embodiment of the present disclosure.

If a camera is included, it could be built directly into the 3D projector as shown in FIG. 14A. A camera could alternatively be attached as a removable accessory as illustrated in FIG. 14B or FIG. 14C. FIG. 14A shows a 3D projector 1400, which is like the 3D projector 100 with the addition of a camera image sensor 1410 surrounded by flashing LEDs 1412 or similar light sources. The flashing light reflects off reflective targets such as the target 1354 and passes into the camera image sensor 1410. The location of the imaged target 1354 on the image sensor 1410 is used to calculate the direction to the target 1354. The 3D projector 1400 that includes a base assembly 110, a yoke assembly 1420, and a payload assembly 1430. In most cases, the base assembly 110 is stationary relative to its surroundings. The yoke assembly 1420 and the payload assembly 1430 together rotate about an azimuth axis 140 coupled to the base assembly 110. The payload assembly 1430 further rotates about a zenith axis 145 coupled to the yoke assembly 1420. One or more beams of light are projected through window 132 of the payload assembly 1430.

FIG. 14B shows a 3D projector 100 onto which a camera-flash assembly 1440 is removably affixed. In an embodiment, the camera-flash assembly 1440 includes a camera assembly 1450 having a body 1452, one or more wide-angle or fisheye lens assemblies 1454, and corresponding image sensors (not shown) within the body 1452. The camera-flash assembly 1440 further includes one or more flash assemblies 1460. Such an assembly 1460 helps ensure that a relatively bright retroflected spot from an anchor point target is captured by the image sensor. In an embodiment, each flash assembly includes one or more LEDs 1462 or similar light sources arranged on a flexible (flex) circuit board 1464. In an embodiment, the flex circuit board 1464 wraps/extends around a baffle 1466 configured to keep light from the LEDs 1462 from directly reaching the image sensors except when reflected off an object in the environment. In an embodiment, the camera assembly 1450 is a 360-degree Ricoh Theta camera available in a variety of Ricoh Theta branded models. Ricoh Company, Ltd., has headquarters in Ota, Tokyo.

FIG. 14C shows another way to add a camera accessory to the basic 3D projector 100. In an embodiment, a mobile computing device 1470 such as a mobile phone is removably affixed to the 3D projector 100. Any type of mobile computing device may be used but, in the example of FIG. 14C, the mobile computing device 1470 includes and image sensor assembly 1472, such as two rear-side cameras 1474, 1476—one having a wide field-of-view (FOV) and one having an ultrawide FOV. In an embodiment, the ultrawide camera has a FOV of 120 degrees. The mobile computing device 1470 also includes a camera flash 1478, which provides a bright light that illuminates reflectors such as the reflectors 1310, 1315 to provide corresponding bright spots of illumination on camera images. The mobile computing device 1470 may be coupled to a frame 1480.

In an element 1208 of FIG. 12, which refers overall to projecting a glowing template for each construction object, the 3D projector measures floor heights at each desired projection point and uses the galvanometer mirrors to project the glowing template pattern onto the floor. A construction worker uses the glowing template to mark template points on a surface or to immediately complete a construction task based on the glowing template. In other embodiments, the glowing template pattern is projected onto a wall or ceiling rather than a floor.

Figure 15:
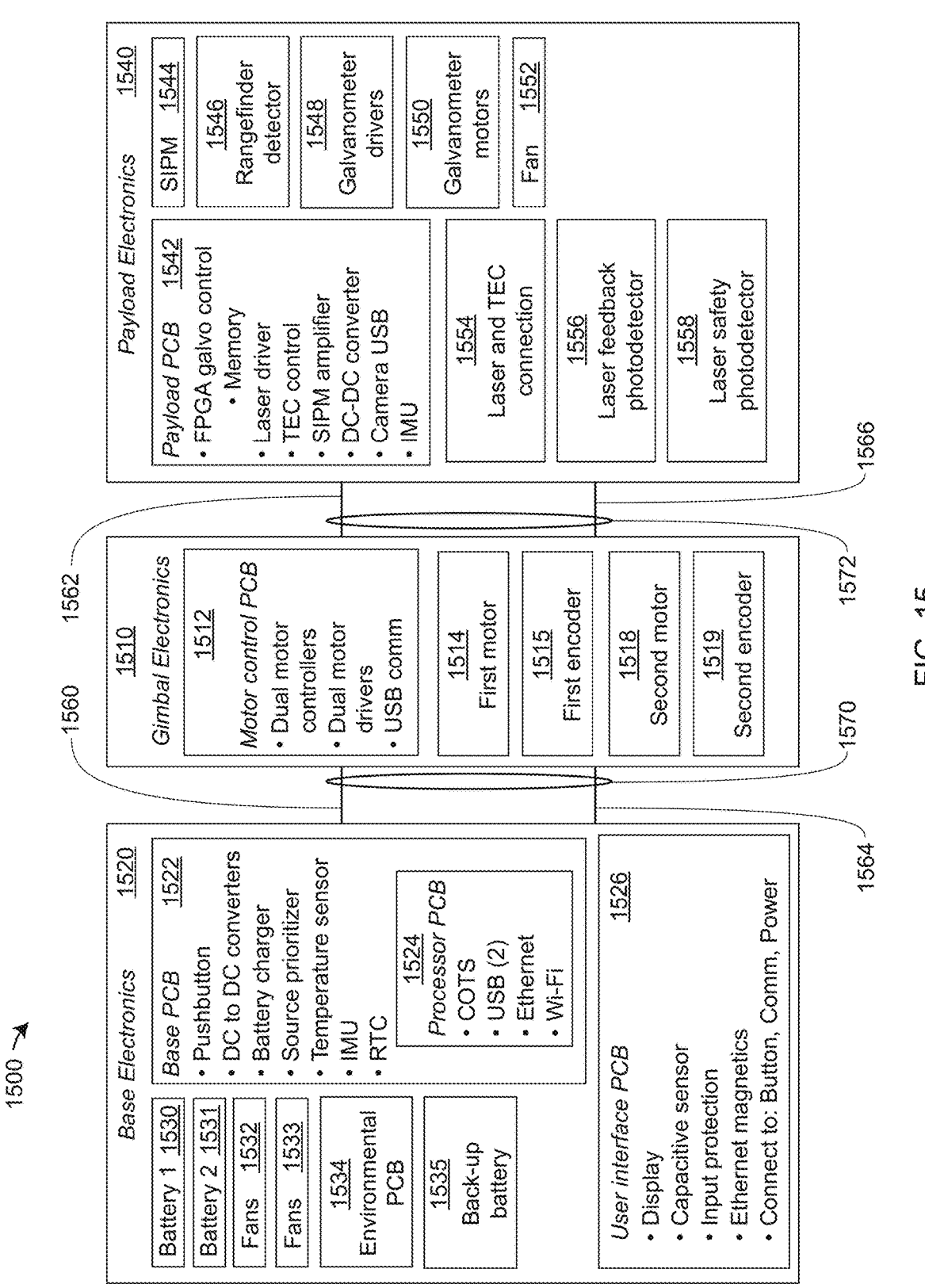
FIG. 15 is a block diagram showing electrical components within the 3D projector according to an embodiment of the present disclosure.

FIG. 15 is a block diagram of electronics 1500 in the 3D projector 100 according to an embodiment of the present disclosure. In an embodiment, electronics 1500 includes base electronics 1520, gimbal electronics 1510, and payload electronics 1540. In an embodiment, base electronics includes a first battery 1530, a second battery 1531, a first fan 1532, a second fan 1533, an environmental printed circuit board (PCB) 1534, a back-up battery 1535, a base PCB 1522, and a user interface PCB 1526. The base PCB 1522 includes a pushbutton, DC to DC converters, a battery charger, a source prioritizer, a temperature sensor, an inertial measurement unit (IMU), a real-time clock (RTC), and a processor PCB 1524. The processor PCB is a commercial off-the-shelf (COTS) unit further including two universal serial bus (USB) units, an Ethernet unit, and a Wi-Fi unit. The user interface PCB includes a display, a capacitor sensor, an input protection circuit, and Ethernet magnetics. The user interface PCB connects to buttons, communications systems, and power systems.

USB is an industry standard giving specifications for cables, connectors, and protocols for connection, communication, and power supply interfacing between computers, peripherals, and other computers. The USB standards are maintained by the USB Implementers Forum (USB-IF). Ethernet is a family of wired computer networking technologies. It was commercially introduced in 1980 and first standardized in 1983 as IEEE 802.3. Ethernet was approved on an international level by the International Electrotechnical Commission (IEC) and International Organization for Standardization (ISO). The ISO 8802-3 standard was published in 1989. Wi-Fi is a family of wireless network protocols based on the IEEE 802.11 family of standards. It is commonly used for local area networking of devices and Internet access, allowing nearby digital devices to exchange data using radio waves. Wi-Fi is a trademark of the non-profit Wi-Fi Alliance.

Gimbal electronics 1510 includes a motor control PCB, first motor elements 1514, first encoder elements 1515, second motor elements 1518, and second encoder elements 1519. Payload electronics 1540 includes a payload PCB 1542, a laser and thermoelectric controller (TEC) connection 1554, a laser feedback photodetector 1556, a laser safety photodetector 1558, a silicon photomultiplier (SIPM) 1544, a rangefinder detector 1546, galvanometer drivers 1548 for first and second galvanometer mirrors, galvanometer motors 1550 for first and second galvanometer motors, and a fan 1552. The motor control PCB 1512 includes dual motor controllers, dual motor drivers, and USB communications support. The base electronics 1520 and the gimbal electronics 1510 are interconnected by a cable 1570 containing twisted-pair wires 1560, 1564. The gimbal electronics 1510 and the payload electronics 1540 are interconnected by a cable 1572 containing twisted-pair wires 1562, 1566.

Figure 16:
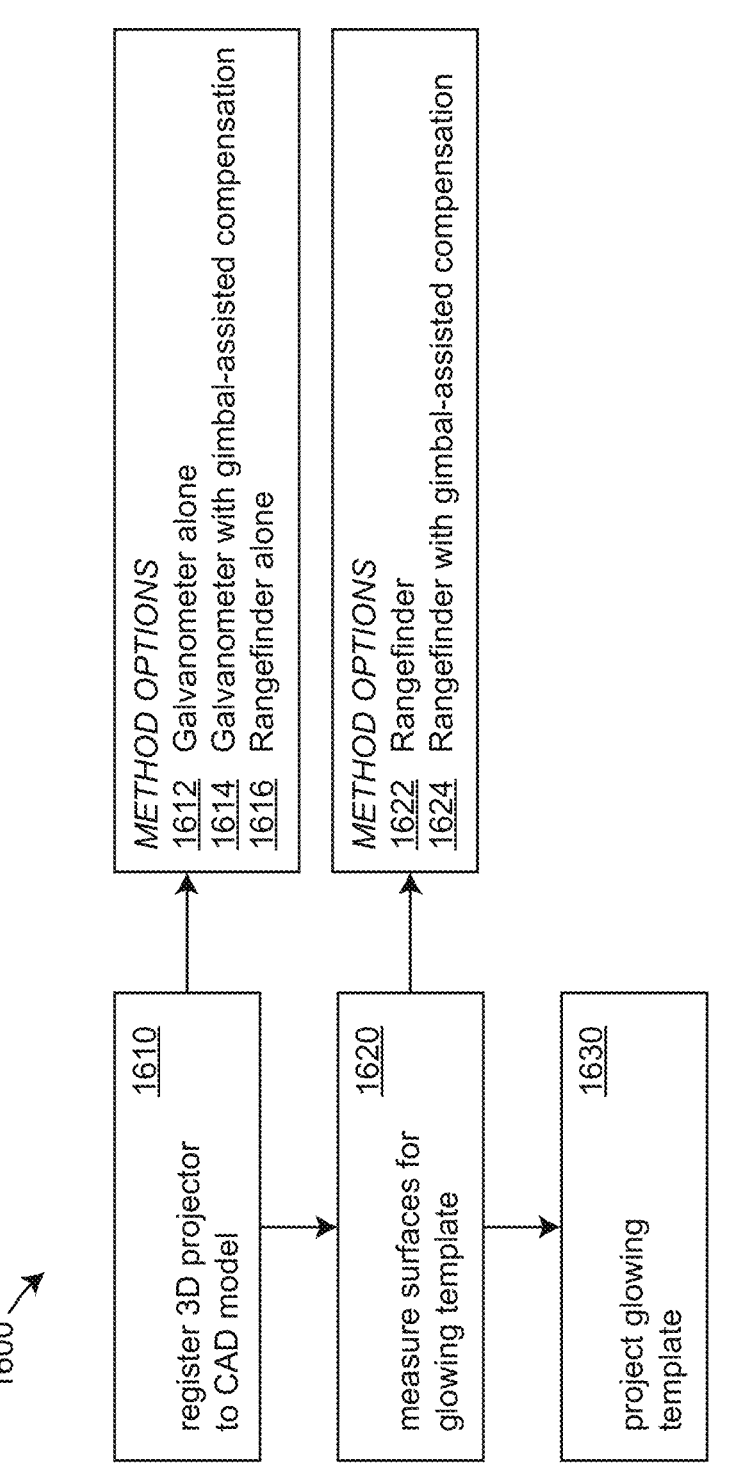
FIG. 16 is a block diagram showing optional elements of a method leading to projection of a glowing template onto a surface according to an embodiment of the present disclosure.

FIG. 16 is a block diagram of a method 1600 showing some alternative methods by which the elements of blocks 1206 and 1208 in FIG. 12 can be achieved. Block 1206 includes the element of determining the pose of the 3D projection device in the CAD model. This is equivalent to registering the 3D projector to the CAD model, as indicated in block 1610. Three optional methods are listed in the box adjacent to the block 1610. In the method 1612, the galvanometer alone is used to determine the six-DOF pose of the 3D projector within the frame of reference of the CAD model. With this approach, at least two markers need to be measured, although this may be more reliably accomplished by measuring at least three markers. In the method 1614, the galvanometer system 310 is used in combination with the gimbal steering mechanism of the 3D projector. If done correctly, this approach enables the determination of numerous parameters relevant to the 3D scanner, as explained herein below in reference to FIGS. 19A, 19B, 19C, 19D, 19E. In the method 1616, the rangefinder alone is used to determine the pose of the 3D projector 100. A difficulty with this approach is that movements of the gimbal mechanism to steer the rangefinder is relatively slow compared to the galvanometer system 310. In many cases, a galvanometer system can locate the center of a reflective target with a second. In addition, a rangefinder capable of attaining the desired accuracy to a relatively long range of say 50 meters is likely to be relatively expensive and large.

The method 1200 then proceeds to block 1208 includes the element of measuring the floor height at each desired projection point, as indicated in block 1620. The height of poured concrete will typically vary by several millimeters over a floor. Because the CAD model does not ordinarily account for this floor height, the 3D projector 100 will be falsely directed to send a beam of light to a point different than that indicated in the CAD model. In the method 1622, a rangefinder is used to measure the height of the floor so that light projected from the 3D scanner to create the glowing template will be directed to the correct 3D location. In the method 1624, a rangefinder is again used to measure the height of the floor, but now the measurement is done in a backsight mode as well as a frontsight mode. Using this method, further described herein below in reference to FIG. 20, the rangefinder may be compensated to account for errors that arise in a gimbal steering mechanism. Block 1208 further includes the element of using the galvanometer mirrors to project a glowing template pattern, as also indicated in block 1630. The method options of FIG. 16 are discussed further herein below.

A specific exemplary method 1614 for registering the 3D projector 100 to the CAD model with gimbal-assisted compensation is now discussed. In an embodiment described herein below in reference to FIGS. 18, 19A, 19B, 19C, 19D, 19E, a plurality of anchor targets are measured in each of a plurality of different gimbal orientations.

FIG. 18 shows that an element 1802 of the method 1800 includes affixing a three-dimensional (3D) projector to a stand, the 3D projector having a projecting mechanism and a gimbal mechanism, the projecting mechanism being operable to steer a beam of light to a projection angle relative to the gimbal mechanism, the gimbal mechanism being operable to steer the 3D projector to a gimbal angle relative to the stand. In an embodiment, the 3D projector is the 3D projector 100. The gimbal angles include the azimuth angle and the zenith angle. In an embodiment, the gimbal mechanism includes the motor-encoder assembly 600A mounted on the zenith axis 145 and the motor-encoder assembly 600B mounted on the azimuth axis. In an embodiment, the motor-encoder assembly 600B rotates the yoke assembly 120 and the payload assembly 130 about the azimuth axis 140, which is coupled to the base assembly 110. The motor-encoder assembly 600A further rotates the payload assembly 130 about the zenith axis 145, which is coupled to the yoke assembly 120. The motor encoder assemblies 600A, 600B further measure the angles of rotation.

An element 1804 of the method 1800 includes determining a six degree-of-freedom (six-DOF) pose of the 3D projector based at least in part on steering at least one of the projecting mechanism and the gimbal mechanism to place the beam of light on each of a plurality of anchor targets in each of a first instance and a second instance, each anchor target having an anchor point with 3D coordinates known in a computer-aided design (CAD) model, each projection angle and gimbal angle to each of the plurality of anchor targets being different in the first instance and the second instance.

Figures 19A, 19B, 19C, 19D, 19E:
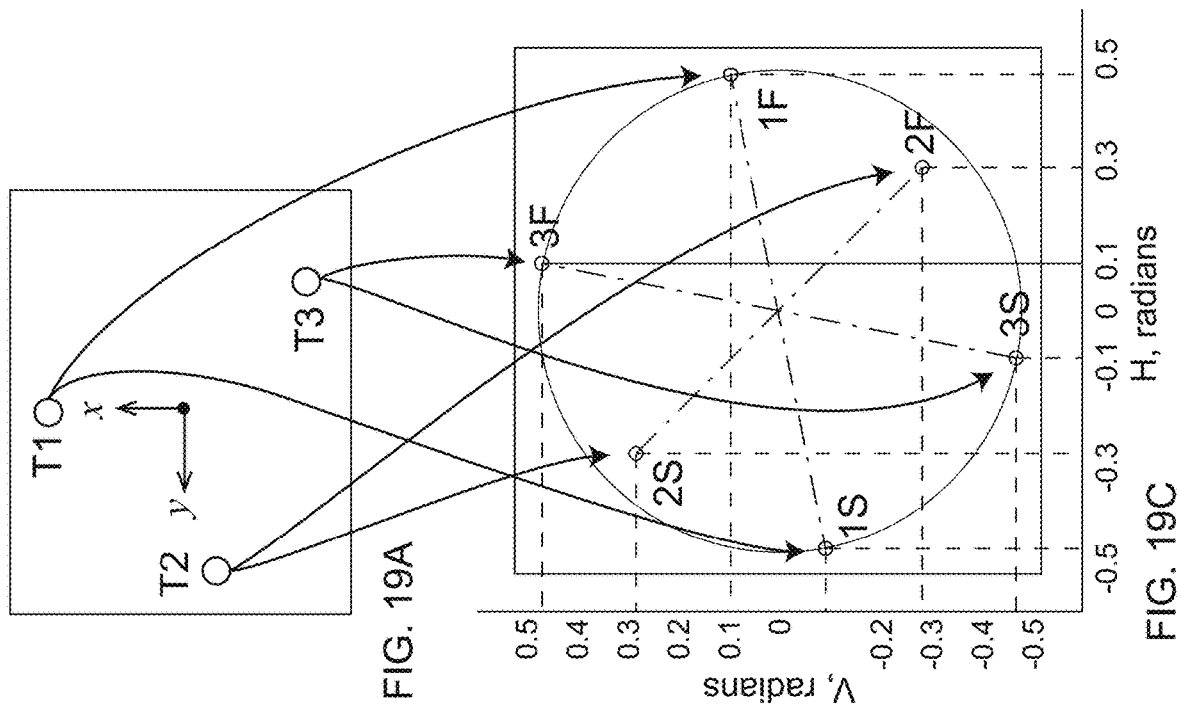
FIG. 19A is a top view of target markers in a world coordinate system.
FIG. 19B is a table showing azimuth and zenith gimbal angles selected from measurement of the three target markers having exemplary 3D coordinates in the world coordinate system according to an embodiment of the present disclosure.
FIG. 19C is a view of three target markers in the horizontal-vertical angle space of the galvanometer system for the azimuth and zenith angles given in FIG. 19B according to an embodiment of the present disclosure.
FIGS. 19D, 19E are tables showing selected H and V angles as illustrated in FIG. 19C according to one or more embodiments described herein.

A specific example of the element 1804 is illustrated in FIGS. 19A-19E. FIG. 19A shows the coordinates of three anchor points T1, T2, T3 having known 3D coordinates in the frame of reference 1730 the CAD model. The axes x and y in FIG. 19A are the axes of the CAD model, and the z axis is perpendicular to x and y, with z pointed upward (out of the page). FIG. 19B shows the x, y, z coordinates of the anchor points T1, T2, T3 in the CAD model. The field designations 1F, 2F, 3F refer to "first" measurements made of the three anchor points. The field designations 1S, 2S, 3S refer to "second" measurements made of the three anchor points. The values of x, y, z do not change from the first to the second measurements since these coordinates are given in the frame of reference of the CAD model.

To obtain good performance for the galvanometer system 310 over a wide range of H and V angles, the H and V angles are selected, in an embodiment, to be the negative of the values selected in the first instance. So, in the example of FIGS. 19D, 19E, the selected H and V angles for the 1F measurement are H=+0.471239 radian for 1F and H=−0.471239 radian for 2F. The effect of this selection can be seen in FIG. 19C, which shows that 1F and 2F are on opposite sides of the H-V plane. By repeating this procedure for points 2 and 3 and by selecting the angles appropriately, the measured points cover a large portion of the H-V plane. In practice, the values of the H and V values can be selected for the first and second instance, and the Az and Ze angles correspondingly selected to send the beam of light from the galvanometer system 310 to the targets T1, T2, and T3.

An element 1806 includes storing the determined six-DOF pose of the 3D projector.

Following the method of FIG. 18 with three or more anchor point targets as illustrated in FIGS. 19A, 19B, 19C, 19D, 19E, each anchor-point target is measured twice, resulting in a total of six anchor point measurement. Each anchor point measurement results in two independent equations, producing a total of 12 independent equations. These 12 equations can be solved to obtain the compensation parameters by an iterative least-squares method such as a Newton-Gauss method. For the case illustrated in FIGS. 19A, 19B, 19C, 19D, 19E, it is possible to determine the following ten compensation parameters:

GX=x location of the gimbal point 630 in the world frame of reference 1730;

GY=y location of the gimbal point 630 in the world frame of reference 1730;

GZ=z location of the gimbal point 630 in the world frame of reference 1730;

ωG=roll rotation of the gimbal frame 1710 about the x-axis of the world frame of reference 1730;

φG=pitch rotation of the gimbal frame 1710 about the y-axis of the world frame of reference 1730;

κG=pitch rotation of the gimbal frame 1710 about the z-axis of the world frame of reference 1730;

HSc=beam steering horizontal angular scale parameter used to correct errors primarily resulting from angular scale errors of the galvanometer system 310;

VSc=beam steering vertical angular scale parameter used to correct errors primarily resulting from angular scale errors of the galvanometer system 310;

HOfs=beam steering horizontal angular offset parameter used to correct errors primarily resulting from angular offset errors of the galvanometer system 310; and VOfs=beam steering vertical angular offset parameter used to correct errors primarily resulting from angular offset errors of the galvanometer system 310.

The purpose of the last four compensation parameters is to calculate beam-steering corrections to be applied to the horizontal (upper) galvanometer mirror 362 and the vertical (lower) galvanometer mirror 372:

$$HM_{STEER}=(1+HSc)\cdot HM+HOfs;$$

$$VM_{STEER}=(1+VSc)\cdot VM+VOfs.$$

Here HM is a horizontal beam steering angle applied to the horizontal (upper) galvanometer mirror 362 and VM is the vertical beam steering angle applied to the vertical (lower) galvanometer mirror 372.

In addition to these ten compensation parameters, the 3D scanner 100 has a number of other compensation parameters that in an embodiment are found at an initial factory calibration. These parameters may be verified or further adjusted during an annual calibration. Examples of parameters found in an initial factory calibration but not adjusted during routine operation of the 3D projector include gimbal-axis non-squareness (AXNS), gimbal beam offset (TX, TY), gimbal beam angle deviation (RX, RY), six-DOF pose of the galvanometer system 310 relative to the gimbal point 630 of the 3D projector 100, and projector non-orthogonality. A common method for determining the gimbal compensation parameters such as TX, TY, RX, RY, AXNS involves making frontsight and backsight measurements of multiple reflectors in the environment. Angles used for compensation measurements include measured galvanometer angles VM and HM, the measured azimuth angle $\Phi$ of rotation about the azimuth axis 140, and the measured zenith angle $\Theta$ of rotation about the zenith axis 145. The angles $\Phi$ and $\Theta$ are measured by the azimuth motor-encoder assembly 600B and the zenith motor-encoder assembly 600A, respectively. Methods for using frontsight and backsight measurements used to obtain TX, TY, RX, RY, and AXNS parameters (or equivalent parameters given by other labels) are widely used and well known for laser trackers and also apply to the 3D projector 100.

After the registration is completed, glowing templates are projected onto construction surfaces such as floors. In most cases, surfaces such as floors do not have as-built dimensions that accurately match the as-designed dimensional measurements on the CAD model. For example, it is common for actual floor height to vary by many millimeters from the nominal value, even over small areas. As a result of this uncertainty in the height and flatness of floor surfaces, glowing templates may be projected to locations inconsistent with the design intent of the CAD model.

To get around this problem, a rangefinder such as the rangefinder 210 may be used to project a beam 212 onto points on the surface to determine the height and flatness of the surface onto which the glowing template is to be projected. For a properly registered 3D projector 100, the two angles of the projected of the rangefinder beam 212 are known. However, any instability in the pointing direction of the rangefinder 210, either as a result of rangefinder jitter or rangefinder drift, will result in errors in the projected direction of the beam 212 intersecting the surface. A step that may be taken to minimize the effect of rangefinder error is to limit the maximum distance being measured. For example, in an embodiment, the galvanometer system 310 is used to measure anchor targets up to 50 meters from the 3D projector 100 and the rangefinder is used to measure points up to 10 meters from the 3D projector 100. Another step that may be taken when projecting onto a floor is to use a center extension 1012 or similar mechanism to raise the 3D projector 100 on a stand 1010, as shown in FIG. 11. By projecting onto the floor at a steeper angle, the error in placement of the glowing template along the floor surface is reduced.

As explained herein above with reference to FIG. 6, in an embodiment, the beam of light 212 emitted by the rangefinder 210 intersects the azimuth axis 140 and the zenith axis 145 at the single gimbal point 630, which in the ideal case is the mechanical center of rotation. For the case in which the rangefinder 210 projects consistently in the same direction with little tendency to change direction over time, a single measurement with the rangefinder may provide an enough accuracy in determining the position of the glowing template. In most cases, an accuracy of ⅛ inch (around 3 mm) is desired placing a glowing template pattern on a floor or other surface. If the 3D projector is raised to a height of 2.3 meters and the beam 212 projected a rangefinder distance of 10 meters, then it can be shown that the rangefinder accuracy will need to be a fraction of a millimeter to obtain the desired 3 mm accuracy in features located with the glowing template.

In practice, the angle of rotation about the zenith axis 145 will be slightly different than the angle reading of the angular encoder 930 in the motor-encoder assembly 600A of FIG. 9. In an embodiment, a compensation parameter RY is used to account for this difference. The compensation parameter is simply added to the reading of the angular encoder 930 to obtain the corrected (compensated) angular encoder reading: $\Theta(actual)=\Theta(encoder)+RY$. A complication arises if changes in the pointing direction of the rangefinder beam 212 add further drift to the rangefinder measurement. For example, such drift may occur if beam from the rangefinder so that it does not track the pointing direction of the zenith axis. Suppose that the rangefinder beam is initially aligned to the corrected reading of the zenith angular encoder 930, $\Theta(actual)=\Theta(encoder)+RY$. At a later time, the rangefinder beam 212 has drifted by an additional angular amount $\Delta RY$ so that $\Theta(actual)=\Theta(encoder)+RY+\Delta RY$ Likewise, similar effects are possible for rotational instability of the rangefinder about the azimuth axis 140. Other smaller effects are possible for offset in beam position relative to zenith axis 145 or the azimuth axis 140, but these are typically much smaller than those resulting from beam pointing instability.

A method is now described for improving the accuracy in the measured rangefinder readings under these conditions of relative pointing instability. As an example of the improvement possible with this method, consider the case in which a point to be measured on a floor surface is 10 meters distance from the 3D projector 100 (along a horizontal direction). Further let the 3D projector be arranged to project light onto the floor surface at an angle of 20 degrees with respect to the floor surface. Take the possible range of parameters of the gimbal system to be $|RX|\le 2°$, $|RY|\le 2°$, $|TX|\le 5$ mm, $|TY|\le 5$ mm. In an embodiment, using standard factory compensation procedures, the parameters RX, RY, TX, TY are all determined to a relatively high level of accuracy and errors that result from their use can be neglected. In contrast, the beam pointing instability, which in one dimension might vary with temperature and time by $\Delta RY<1$ mrad and the corresponding beam translational instability in one dimension might be $\Delta TX<0.5$ mm. It can be shown that, using a conventional method of calculation, the error in surface height resulting from these errors $\Delta RY$, $\Delta TX$ is 10.33 mm and the corresponding error in projection trajectory displacement is 28.4 mm. It can further be shown that, in contrast, the method described herein below in reference to FIG. 20 reduces the error in the calculated surface height to 0.1 mm and the error in projection trajectory displacement to 0.28 mm. In other words, for this case, error is reduced by a factor of approximately 100.

The method 2000 of FIG. 20 measures a point on a surface such as a floor to determine the as-built height of that point on the floor in relation to the as-designed height of that point on floor. In FIG. 20, block 2002 of the method 2000 includes aiming a three-dimensional (3D) projector to a point having selected 3D coordinates on an as-designed surface of a computer-aided design (CAD) model, the aiming being at a first frontsight angle of a first angular transducer and a second frontsight angle of a second angular transducer, the first angular transducer and the second angular transducer being coupled to the 3D projector. In an embodiment, the 3D projector is the projector 100. The selected 3D coordinates of a point on the as-designed surface of the CAD model may be in error because the point may not have been measured by a total station or other relatively accurate device. To project a glowing template pattern to the correct location, a corrected 3D measurement of the point on the surface is needed. Because of errors often found in rangefinders, as discussed herein above, it is desired to have a way to correct those errors. In an embodiment, the first angular transducer is the angular encoder 930 of the motor-encoder assembly 600A, and the second angular transducer is the angular encoder 930 of the motor-encoder assembly 600B. The aiming of the 3D projector to a point having selected 3D coordinates on an as-designed surface is performed using the angular encoders in combination with motor assembly 910 and bearing assembly 950 of the motor-encoder assemblies 600A, 600B.

Block 2004 of the method 2000 includes projecting a beam of light from the rangefinder to the point on the as-built surface and reading with the rangefinder a frontsight distance. With the 3D projector 100 aimed at the point on the as-designed surface, projecting the beam of light from the rangefinder to the point on the as-built surface is obtained by simply turning on the rangefinder, which emits the beam of light.

Block 2006 includes, for a reference point located at the first frontsight angle, the second frontsight angle, and the frontsight distance, determining with a processor 3D coordinates of the reference point as given in a backsight mode of the 3D projector. As stated herein above, errors in the pointing of the beam projected from the rangefinder, for example, resulting from ΔRY, cause those errors to be produced symmetrically about the projection to the reference point. Compensation parameters of the 3D projector 100 such as RY and TX are known from an accurate compensation carried out in a separate step, for example, in a factory compensation. The use of the processor in the element 2008 enables the application of these known compensation parameters so that, in the backsight mode, the 3D projector may be aimed to the 3D coordinates of the reference point as given in the backsight mode. A method of iterative least-squares minimization may be used to find the aiming direction.

Block 2008 includes, with the 3D projector in the backsight mode, aiming the 3D projector at the determined 3D coordinates of the reference point as given in the backsight mode of the 3D projector, projecting a second beam of light from the 3D projector toward the reference point as given in the backsight mode of the 3D projector, and measuring with the rangefinder a backsight distance to the as-built surface.

The element 2008 calculated the desired aiming direction, and the element 2010 actually aims a rangefinder beam such as the beam 212 in the determined direction and measures the distance to the as-built surface with the rangefinder.

Block 2010 includes, with the processor, determining corrected 3D coordinates of the as-built surface based at least in part on the first frontsight angle, the second frontsight angle, and an average of the measured frontsight distance and the measured backsight distance. For the specific example discussed above in which the rangefinder 210 has an error of ΔRY=1 mrad, the error in the measured depth of the point, if positive in frontsight mode relative to the as-designed surface, will be negative in backsight mode. To a good approximation, these positive and negative values cancel out in the step of taking the average of the measured frontsight distance and the measured backsight distance. The element 2012 includes storing the corrected 3D coordinates of the as-built surface.

Figure 21:
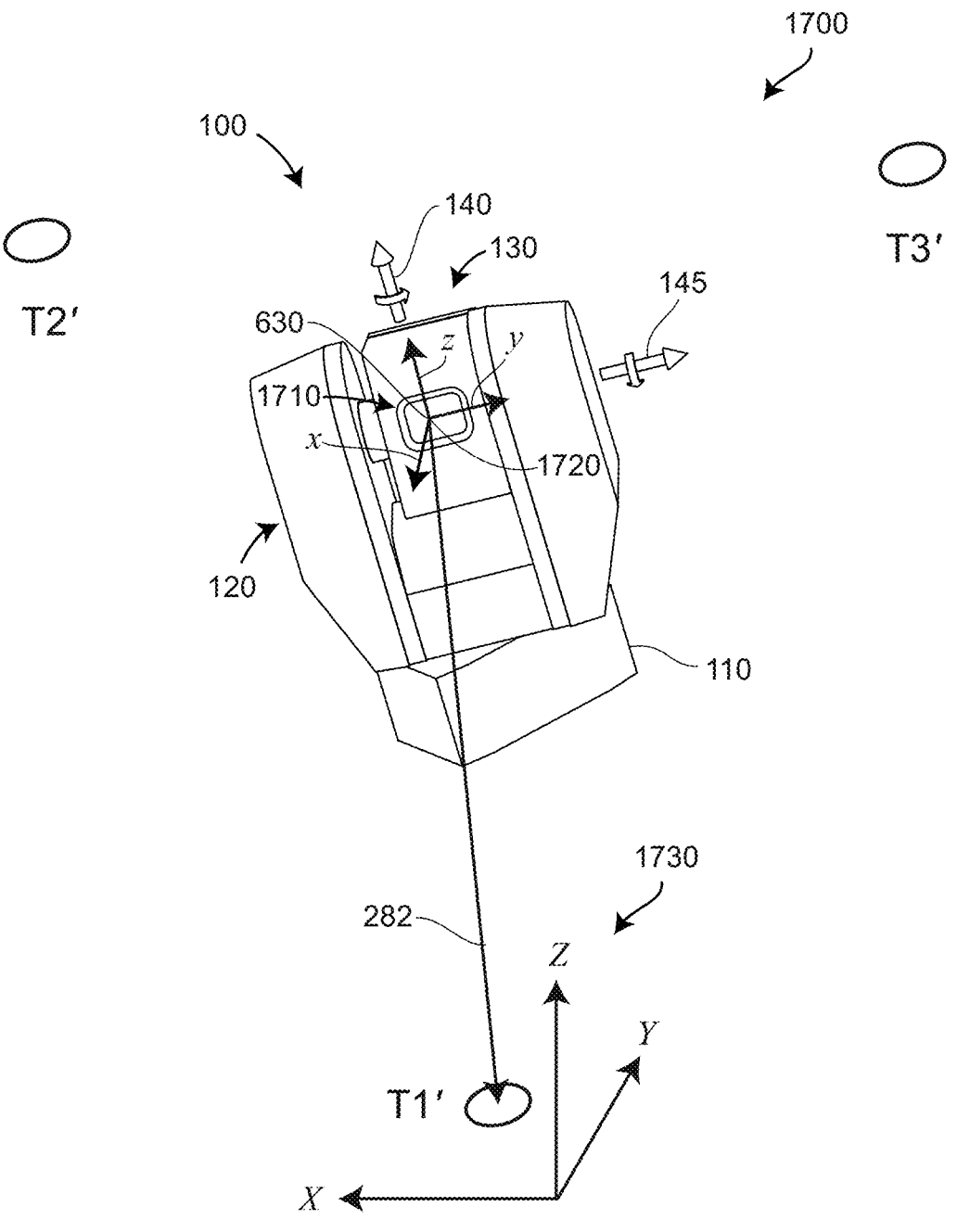
FIG. 21 is an isometric drawing showing a galvanometer beam emitted from a gimbal point according to an embodiment of the present disclosure.
Figure 22:
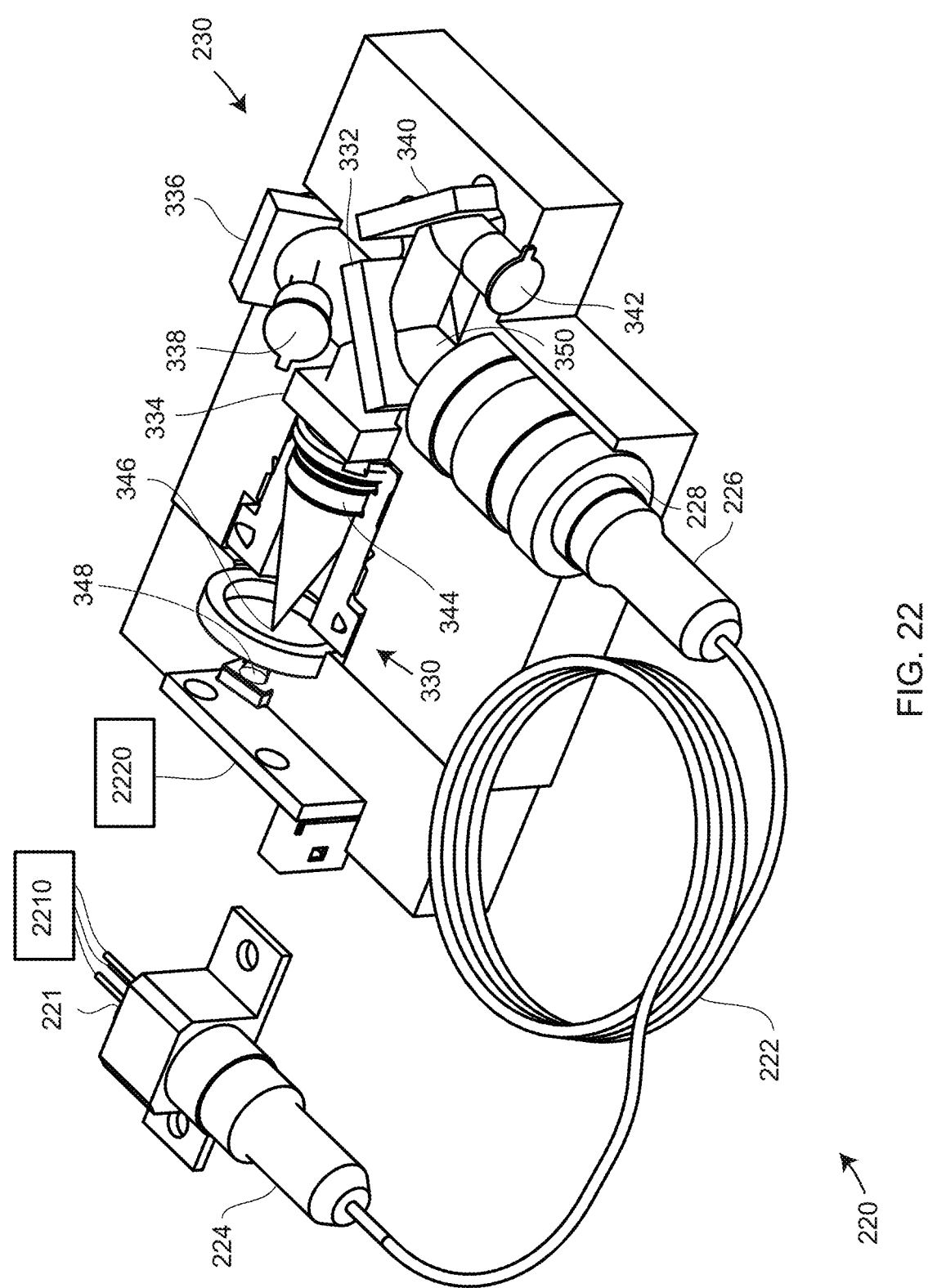
FIG. 22 is partly an isometric view and partly a sectional view of an assembly within the 3D projector that further includes electrical components to enable distance meter using a galvanometer beam according to an embodiment of the present disclosure.

The method 2000 of FIG. 20 corrects a rangefinder 210 that is not perfectly stable. The rangefinder 210 emits a beam 212 that is offset from a beam 282 reflected by galvanometer mirrors. Because of its construction and compensation methods, the galvanometer system 310 is relatively very stable, which is why it can be used in an embodiment to register anchor targets at distances up to 50 meters from the 3D projector 100. A way to get around the need to correct errors in a rangefinder 210 is to eliminate the rangefinder 210 by making the rangefinder beam the beam emitted by the 3D projector. FIG. 21 shows the single beam 282 being emitted from the gimbal point 630 of the 3D projector 100. FIG. 22 is similar to FIG. 3 except that an electronics modulation block 2210 and an electronics distance extraction block 2220 are included. In one embodiment, the electronics modulation block applies signal sinusoidally modulated at one or more frequencies. In an embodiment, the electronics distance decoding circuitry 2220 determines the distance to a target based on an electrical signal from the optical detector 348. Many types of distance measuring approaches are possible for the electrical blocks 2210 and 2220.

A quick way to refresh galvanometer scale and offset drift parameters is by measuring internal compensating mirrors 210A, 210B, 210C, 210D. This procedure ordinarily takes about four seconds. The more thorough registration procedure described in FIGS. 18, 19A, 19B, 19C, 19D, 19E should be performed periodically to refresh all ten parameters.

In an embodiment, each of the four mirrors 210A, 210B, 210C, 210D in FIG. 7A and FIG. 7B are scanned with an 81×81 grid of projected points, although fewer points may be used. When light retroreflects from one of the mirrors, it returns directly to the sensitive scanning detector assembly 330. Light captured by the optical detector 348 will be most intense when light reflected from one of the mirrors 210A, 210B, 210C, 210D retroreflects and passes through the pinhole of the spatial filter 346 onto the optical detector 348. Each of the four mirrors are located at different extreme horizontal and vertical projection angles for the beam 382. Hence, it is possible to the determine the extent of galvanometer mirror rotation needed to scan to the extreme horizontal and vertical projection angles. It is also possible to scan just two diagonally opposite mirrors such as the mirrors 270A, 270C or the mirrors 270B, 270D to find the extent of galvanometer mirror rotation needed to scan the extreme horizontal and vertical projection angles. Scanning four mirrors instead of two mirrors provides an advantage in reducing noise somewhat. It is also possible to reduce the number of points scanned to a grid of fewer than 81×81.

In an embodiment, the registration procedure of FIGS. 18, 19A, 19B, 19C, 19D, 19E is first used to establish an initial registration. This procedure is followed by the scanning the mirrors as described above. Some time later, to check whether there has been a drift in the angle scale or angle offset parameter, the mirrors are scanned again. If there has been a change in the extreme angles that retroreflected the beam from the mirrors, this change is noted. The difference in the extreme mirror angles is used to calculate a new angular scale parameter, which can be compared to the earlier scale parameter. The midpoint between the extreme mirror angles is used to calculate the offset parameter, which can be compared to the earlier offset parameter. If the scale or offset parameters have changed by a larger than expected amount, a complete registration procedure illustrated in FIGS. 18, 19A, 19B, 19C, 19D, 19E can be performed. Otherwise, the new scale and offset parameters can be applied to the measured rotation of the mirrors 362, 372 to determine the horizontal and vertical angle of a beam 282 that leaves the exit window 132 of the 3D projector as illustrated in FIG. 3.

FIG. 23 illustrates elements of a method 2300 for determining angular scale and drift parameters. Block 2302 of the method 2300 includes steering with a first galvanometer mirror and a second galvanometer mirror a beam of light from a galvanometer light source to a first multiplicity of positions on a first compensation mirror and receiving first returning light at a galvanometer optical detector, wherein the first galvanometer mirror, the second galvanometer mirror, the galvanometer light source, and the galvanometer optical detector are part of a galvanometer system, the galvanometer system being operatively coupled to the first compensation mirror. Referring to FIG. 7A, in an embodiment, the first and second galvanometer mirrors are 362 and 372. The beam of light includes beam segments 350 and 382. The first and second compensation mirrors are two mirrors selected from the group of mirrors 270A, 270B, 270C, 270D. In an embodiment, the galvanometer optical detector includes the optical detector 348.

Block 2304 of the method 2300 includes steering with the first galvanometer mirror and the second galvanometer mirror a beam of light from the galvanometer light source to a second multiplicity of positions on a second compensation mirror and receiving second returning light at the galvanometer optical detector, the galvanometer system being operatively coupled to the second compensation mirror. Block 2304 is the same as block 2302 but with the beam directed to a second compensation mirror. In an embodiment, the selected compensation mirrors are diagonally opposite one another so that extreme angles are available in both horizontal and vertical scan directions.

Block 2306 includes determining with a processor an angular offset parameter and an angular scale parameter of the galvanometer system based at least in part on the first multiplicity of positions and the second multiplicity of positions. The angular scale parameter may be determined by comparing the difference in extreme horizontal and vertical positions for two diagonally opposite mirrors. The angular offset parameter may be determined by looking at the average of the extreme values in the horizontal and vertical directions. In many cases, it is desirable to calculate drift parameters for the angular offset parameter and the angular scale parameter by comparing current scale and offset values to those measured previously. Block 2308 includes storing the determined angular offset parameter and the determined angular scale parameter.

Figure 24A:
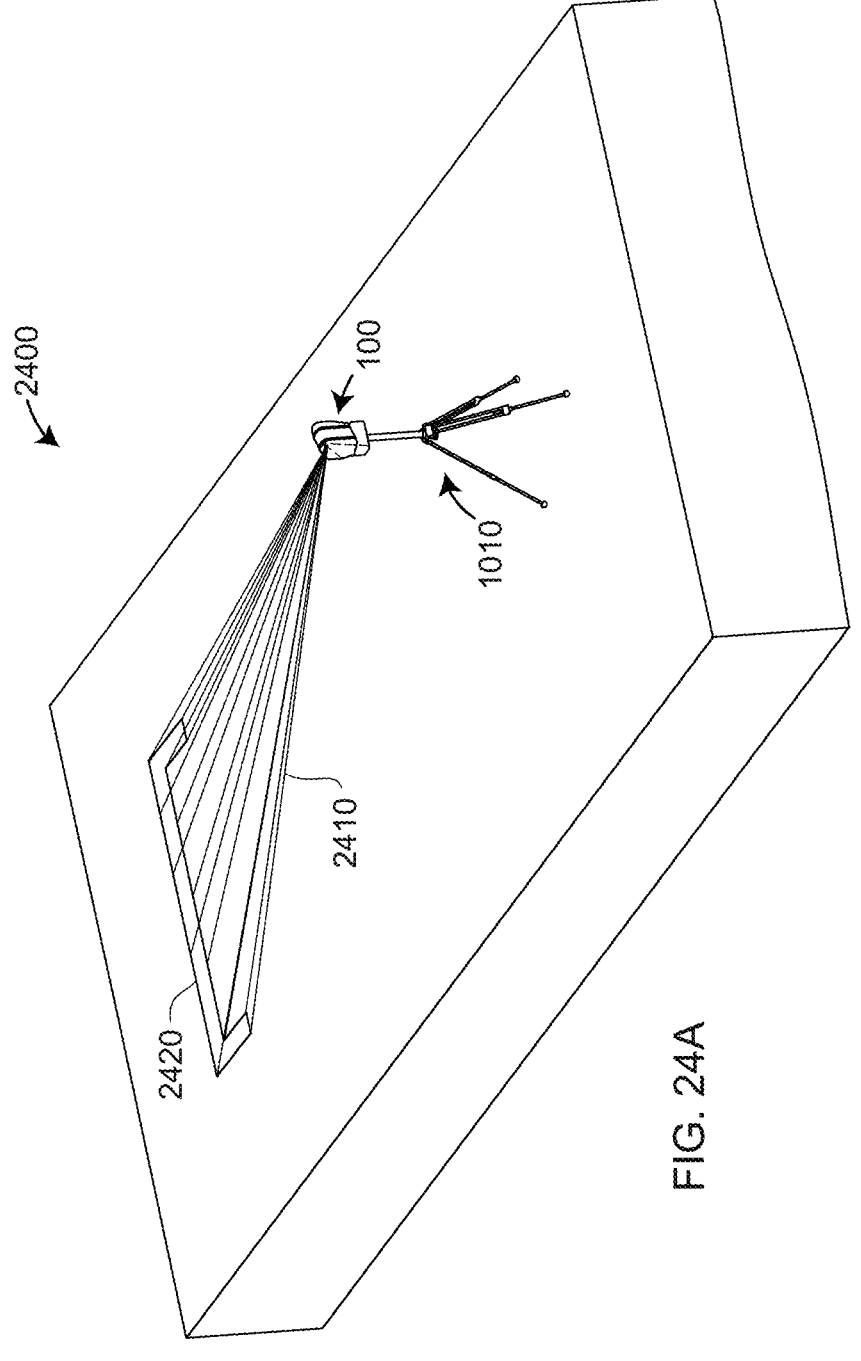
FIG. 24A illustrates a method in which a glowing template is projected onto a surface according to an embodiment of the present disclosure.
Figure 24B:
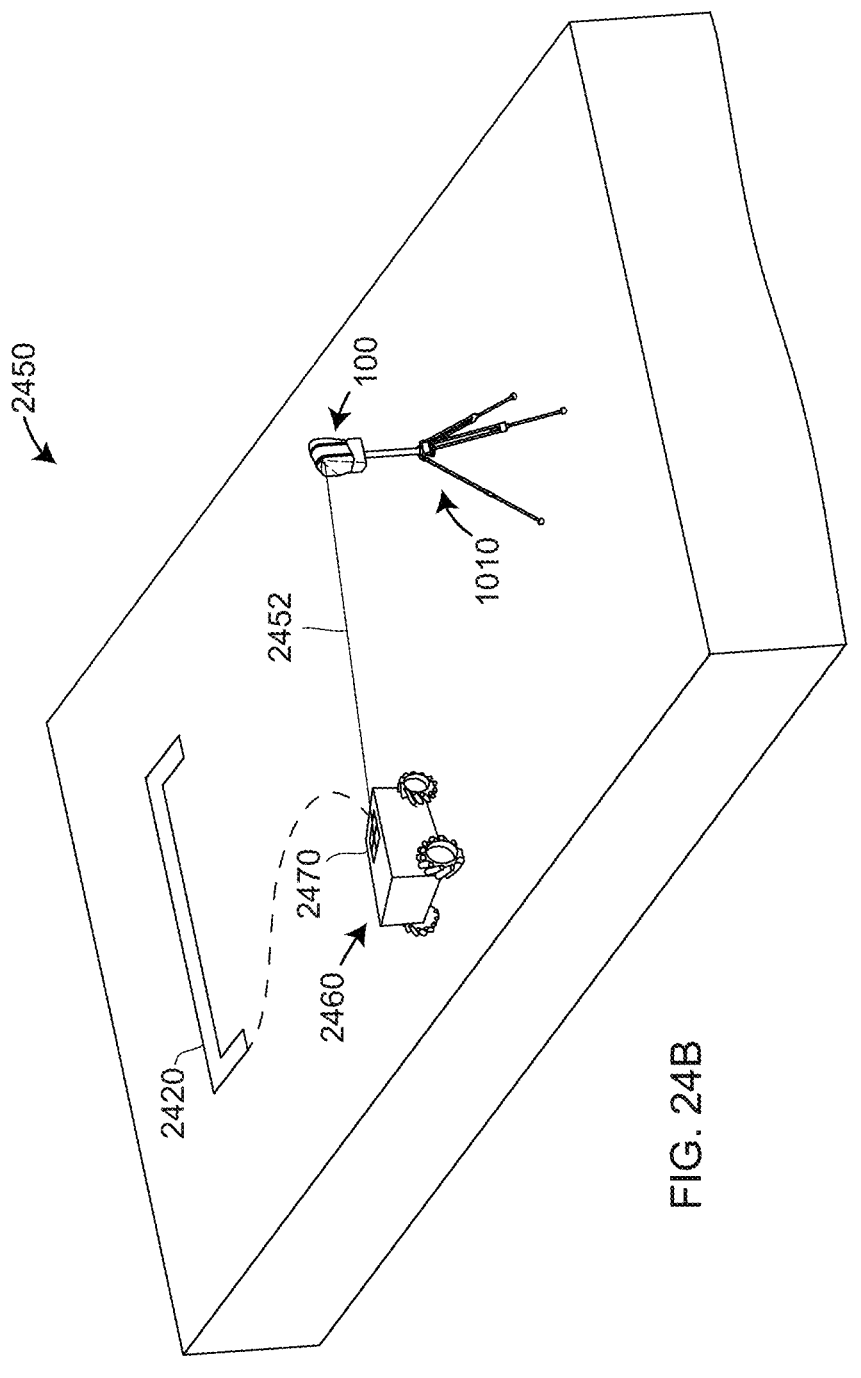
FIG. 24B illustrates a method in which a mobile marking device is moved into position to place marks on a surface according to an embodiment of the present disclosure.

FIG. 24A illustrates a system 2400 having a 3D projector 100 on a tripod 1010 projecting beams of light 2410 to generate a glowing template 2420 outlining an area of construction interest 2450. FIG. 24B is an isometric drawing showing the 3D projector 100 projecting a beam of light 2452 onto a position detector 2470 located on a mobile marking device 2460. The mobile marking device 2460 is programmed to move itself so as to keep the beam of light 2452 centered on the position detector 2470. The 3D projector receives instructions from a processor indicating the path 2480 that is to be followed by the mobile marking device 2460. When the mobile marking device 2460 reaches the pattern previously indicated by the glowing template 2420, the mobile marker begins to leave a mark on the floor, thereby leaving a lasting record of the previously outlined glowing template 2420. Having left a lasting record of the desired construction outline 2420, the 3D projector 100 may continue to place additional glowing templates 2420 and mark the desired patterns with the mobile marker 2500. In addition, the 3D projector 100 and tripod 1010 may be moved to a new location to continue marking construction features. Leaving of lasting marks with the mobile marker 2500 eliminates the need to have features hand-marked by on-site personnel, and it frees up the 3D projector 100 to continue marking additional areas. Alternatively, other types of laser projection devices such as laser trackers or total stations may be used instead of the 3D projector 100 to direct movement of the mobile marker 2460 by projecting light onto the position detector 2470.

FIG. 25A is a schematic drawing showing a top view of an exemplary mobile marking device 2500, which includes a frame 2501 that holds a position detector 2502, shown in the instance of FIG. 25A as a quadrant detector. A quadrant detector includes four separated detector regions 2503, each region producing an electrical signal that varies according to the amount of received optical power. In an embodiment, a control system of a mobile marker 2500 drives the wheels 2508 to keep the beam 2452 centered on the quadrant detector 2502. This enables the 3D projector 100 or another beam-projecting device to direct the mobile marker 2500 along a desired path.

Besides quadrant detectors, many other types of position detectors are available. An example is a lateral effect position detector, one type of which includes a common anode together with a cathode placed on each side of a square of semiconductor material. The relative voltages read by the four cathodes enables the position of a beam of light striking the detector to be calculated. Another common position detector is a complementary metal-oxide-semiconductor (CMOS) photosensitive array. Pixel readings taken from such an array can be used to determine beam position to relatively high accuracy and at relatively high speed. Many other types of position detectors are possible.

In an embodiment, the mobile marking device 2500 further includes an ink supply 2504 and an ejector nozzle 2506 that projects supplied ink onto a surface that is to be marked. In an embodiment, the 3D projector 100 sends to the mobile marking device 2500 a wireless signal indicating when the ink projection is to be turned on and off. In some embodiments, multiple nozzles project different colors, different widths, and from different positions on the mobile marking device 2500. In some embodiments the projected material is not ink but is another marking substance.

The mobile marking device 2500 includes wheels 2508, which in FIGS. 25A, 25B, 25C, 25D, 25E, 25F are Mecanum wheels, which are in a category of wheels referred to as "omni" wheels. When Mecanum wheels 2508 are mounted on the mobile marking device 2500 as shown in FIGS. 25A, 25B, 25C, 25D, 25E, 25F and independently driven by separate axles, the mobile marking device 2500 can move or rotate in almost any direction. As shown in FIG. 25B, when all four Mecanum wheels 2508 are driven in the same direction and at the same speed, the mobile marking device 2500 moves in the driven direction, which could be forward as shown in FIG. 25B or backwards if the four wheels are turned in a direction opposite that shown in FIG. 25B. As shown in FIG. 25C, driving all four wheels, but in different directions can be used to cause mobile marking device 2500 to move left or right. As shown in FIG. 25D, by fixing two diagonally oriented mecanum wheels 2508 (marked "F" in FIG. 25D and FIG. 25F), the mobile marking device 2500 can be moved diagonally. As shown in FIG. 25E, moving the wheels 2508 on one side of the mobile marking device 2500 in a first direction and on the other side of the device in the opposite direction causes the mobile marking device to rotate in a circle. As shown in FIG. 25F, by fixing the two wheels 2508 on one side of the mobile marking device in place, the device turns in a large arc. By adjusting the relative speeds of the four wheels, it is possible to move the mobile marking device in almost any pattern. A Mecanum wheel is an example of an omni (omnidirectional) wheel or poly wheel, which may in general provide similar functionality to the Mecanum wheel.

Figures 26A, 26B, 26C, 26D, 26E, 26F:
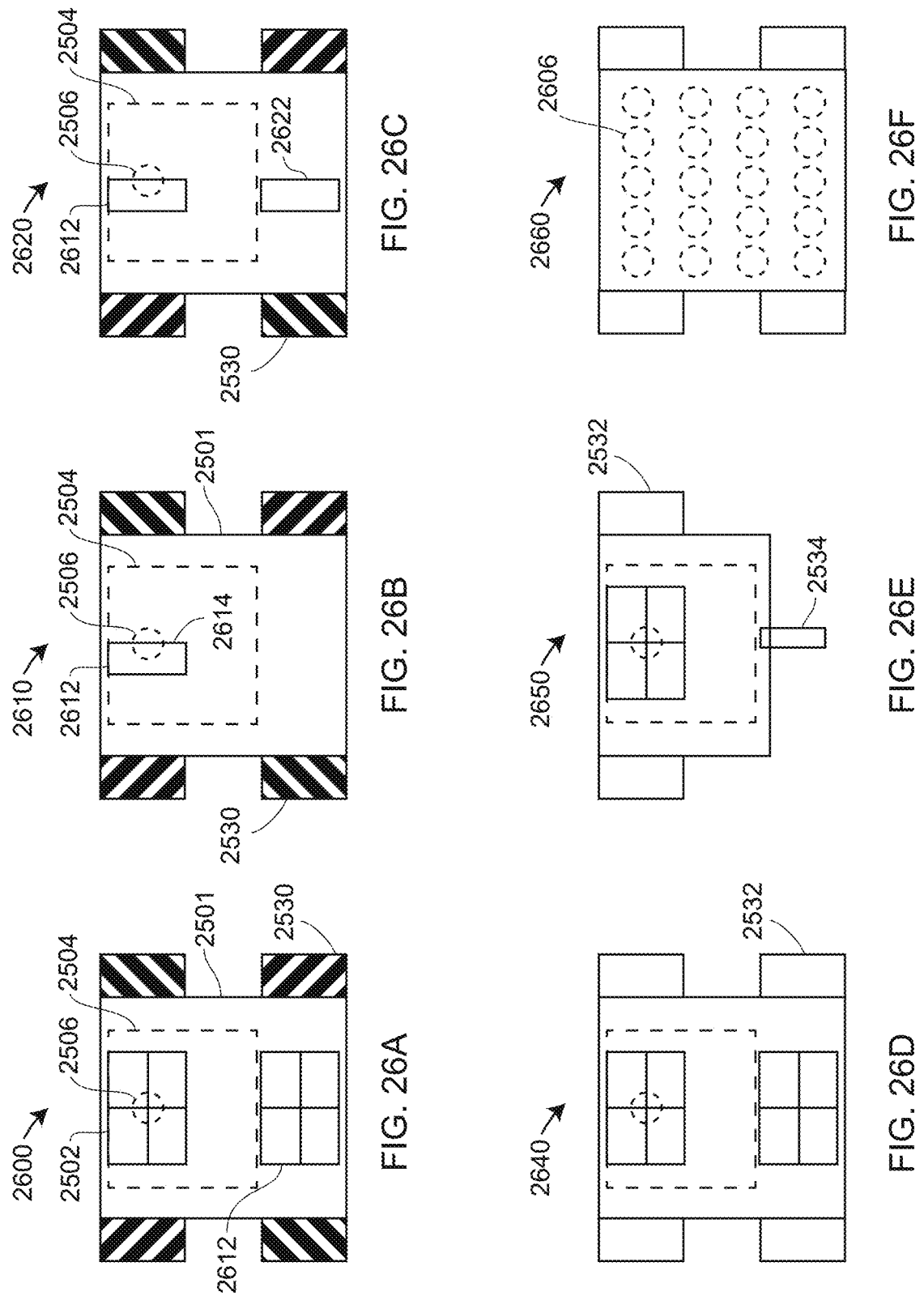
FIGS. 26A, 26B, 26C, 26D, 26E, 26F show a mobile marking devices in a variety of configurations according to embodiments of the present disclosure.

FIG. 26A shows a mobile marking device 2600 that has a frame 2501, a position detector assembly 2502, an ink supply 2504, an ejector nozzle 2506, and in addition includes second position detector assembly 2602. FIG. 26B shows a mobile marking device 2610 having a position detector 2612 oriented vertically. In an embodiment, the detector elements of the position detector assembly 2612 are located on a side 2614 of the assembly, as shown in FIG. 26B. A potential advantage of the vertical orientation of the position detector assembly 2612 in FIG. 26B is that, for the height of the 3D projector 100 much less than the distance to the mobile mapper 2460, as in FIG. 24B, a beam of light 2452 in FIG. 24B will more nearly strike a position detector at normal incidence when the position detector is oriented vertically as in FIG. 26B than when it is oriented horizontally as in FIG. 26A. Intersection of the beam on the detector at more nearly normal incidence will produce a beam that is more nearly circular, which is likely to improve accuracy of the determined ellipse center. FIG. 26C is similar to FIG. 26B except that a second position detector 2622 has been added to the first position detector 2612.

Figure 27:
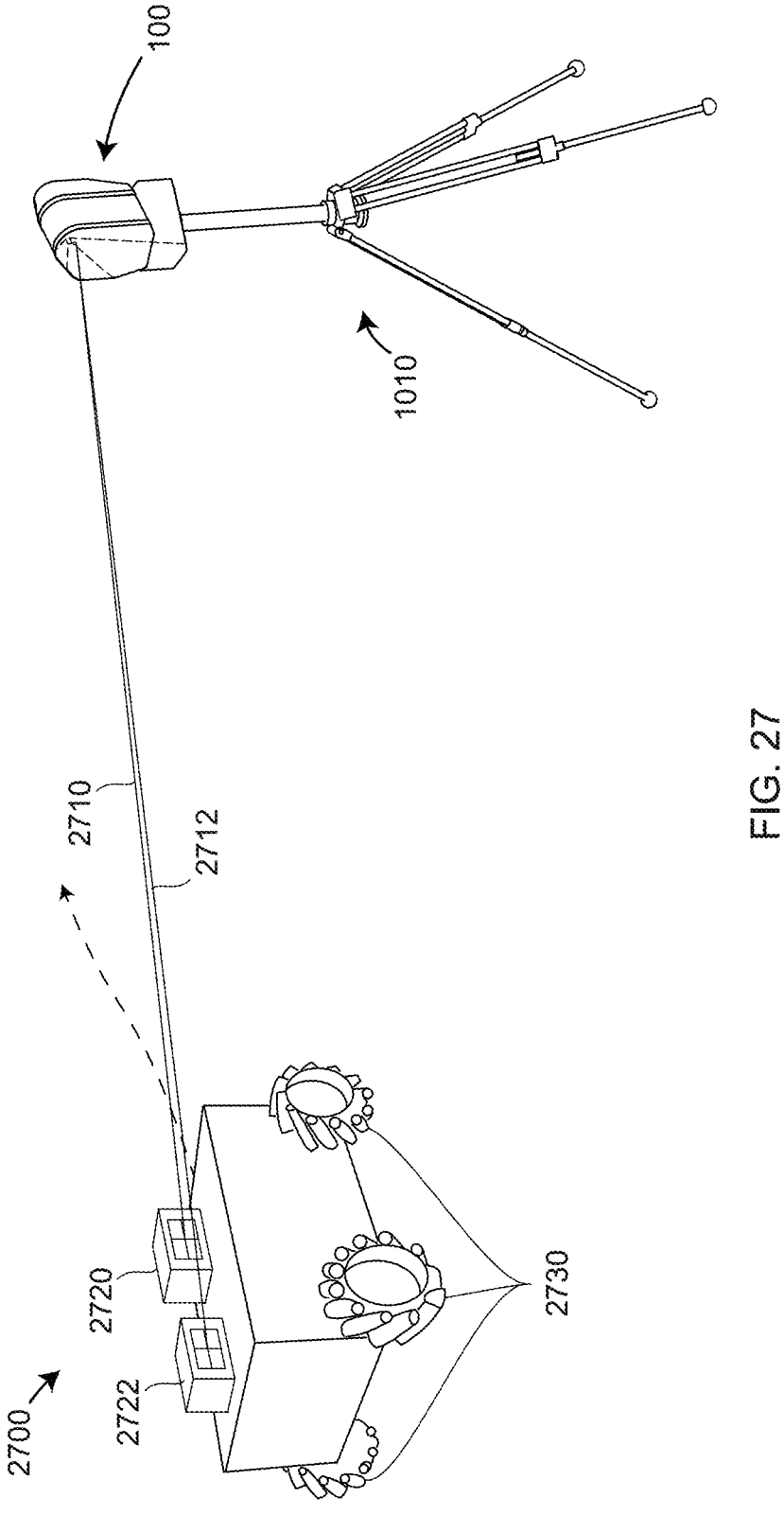
FIG. 27 is a perspective view of a 3D projector rapidly scanning each of two position detectors to accurately guide a mobile marker along a path according to an embodiment of the present disclosure.

FIG. 27 illustrates a case in which a 3D projector 100 rapidly alternates the direction of beams 2710, 2712 to determine directions to each of two position detectors 2720, 2722. The height of the sensors 2720, 2722 above the wheels 2730 can be known ahead of time, so for the case in which the height of the floor is known or measured with the 3D projector 100, the position and orientation of the mobile marking device 2700 is also known, enabling a floor to be accurately marked with ink. As shown in FIG. 27, an advantage of having two position detectors 2720, 2722 is that 3D projector 100 can rapidly alternate measuring the 3D coordinates of the position detectors 2720, 2722 with beams of light 2710, 2712. For example, the measurement rate in such a case might be 100 Hz.

FIGS. 25A, 25B, 25C illustrate the case in which the wheels 230 are Mecanum wheels or another type of omni wheels. Such wheels permit a mobile marking device such as the device 2600, 2610, or 2620 to be steered in any direction and hence simplify steering of the mobile marking device and enable fast and accurate application of ink marks.

However, other types of wheels may also be advantageously used. FIG. 26D illustrates a mobile marking device 2640 in which four wheels 2532 have regular tire tread rather than the type of tread found in an omni wheel. In an embodiment, such wheels are driven by separate axles, thereby enabling the mobile marking device 2640 to be steered along curved paths. On the other hand, the wheels 2532 cannot drive the mobile marking device 2640 directly to the side, either left or right. In a further embodiment, a mobile marking device 2640 shown in FIG. 26E includes a wheel arrangement in which two independently steered wheels 2532 are balanced in travel by a follower wheel 2534 that simply rotates about an axle without being steered by a motor. The wheel arrangement of FIG. 2650. This wheels 2632 and 2634 can be driven to follow a curved path.

FIG. 26F illustrates the case in which a plurality of nozzles 2606 are used to project ink or other marking media onto surfaces. In an embodiment, the nozzles are ink jet cartridges. In some embodiments, the nozzles emit ink of different colors or of different widths. FIG. 26F does not show specific types or numbers of position detectors or specific wheels since a wide variety of position detectors and wheels may be used with multiple nozzles 2606.

While embodiments of the invention have been described in detail in connection with only a limited number of embodiments, it should be readily understood that embodiments of the invention are not limited to such disclosed embodiments. Rather, embodiments of the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, embodiments of the invention are not to be seen as limited by the foregoing description, but is only limited by the scope of the appended claims.

What is claimed is:

1. A method comprising:
affixing a three-dimensional (3D) projector to a stand, the 3D projector having a projecting mechanism and a gimbal mechanism, the projecting mechanism being operable to steer a beam of light to a projection angle relative to the gimbal mechanism, the gimbal mechanism being operable to steer the 3D projector to a gimbal angle relative to the stand;
determining a six degree-of-freedom (six-DOF) pose of the 3D projector based at least in part on steering at least one of the projecting mechanism and the gimbal mechanism to place the beam of light on each of a plurality of anchor targets in each of a first instance and a second instance, each of the plurality of anchor targets having a respective one of a plurality of anchor points with 3D coordinates known in a computer-aided design (CAD) model, each projection angle and gimbal angle to each of the plurality of anchor targets being different in the first instance and the second instance, wherein at least one of: the projection angle in the second instance comprises a negative of the projection angle in the first instance, and the gimbal angle in the second instance comprises a negative of the gimbal angle in the first instance; and
storing the determined six-DOF pose of the 3D projector.

2. The method of claim 1 wherein the projecting mechanism further is configured to emit a first beam of light onto a first galvanometer mirror, rotate the first galvanometer mirror to a first mirror angle with a first galvanometer motor, reflect the first beam of light off the first galvanometer mirror onto a second galvanometer mirror, rotate the second galvanometer mirror to a second mirror angle with a second galvanometer motor, and send the first beam of light out of an exit-aperture of the 3D projector.

3. The method of claim 1 further comprising determining angular scale error parameters of the projecting mechanism and angular offset error parameters of the projection mechanism.

4. The method of claim 1 wherein determining the six-DOF pose of the 3D projector further comprises, for each of the plurality of anchor points and in each of the first instance and the second instance:

sending the beam of light to a plurality of positions on the anchor target; and determining a position of the anchor point on the anchor target based at least in part on a signal produced by an optical detector of the 3D projector, the signal being produced in response to light reflected off the plurality of positions.

5. The method of claim 1 wherein determining the six-DOF pose of the 3D projector further comprises, for each of the plurality of anchor points and in each of the first instance and the second instance: determining a position of the anchor point on the anchor target based at least in part on an image of the anchor target captured by an image sensor operably coupled to the 3D projector.

6. The method of claim 1 further comprising projecting with the projecting mechanism a projected pattern of light onto an as-built surface, the projected pattern of light taking a form of a glowing template pattern, the projected pattern of light based at least in part on the CAD model and the determined six-DOF pose.

7. The method of claim 6 further comprising further basing the projected pattern of light on a distance to the as-built surface measured by a rangefinder of the 3D projector, the rangefinder being either integral to the projecting mechanism or included as a separate element of the 3D projector.

8. The method of claim 6 further comprising projecting with the projecting mechanism the projected pattern of light onto the as-built surface, the projected pattern of light further based at least in part on a determining of 3D coordinates of a plurality of surface points on the as-built surface.

9. The method of claim 8 further comprising:

aiming the 3D projector to a point having selected 3D coordinates on an as-designed surface of the CAD model, the aiming being at a first frontsight angle of a first angular transducer and a second frontsight angle of a second angular transducer, the first angular transducer and the second angular transducer being coupled to the 3D projector;

projecting a beam of light from a rangefinder to the point on the as-built surface and reading with the rangefinder a frontsight distance;

for a reference point located at the first frontsight angle, the second frontsight angle, and the frontsight distance, determining with a processor 3D coordinates of the reference point as given in a backsight mode of the 3D projector;

with the 3D projector in the backsight mode, aiming the 3D projector at the determined 3D coordinates of the reference point as given in the backsight mode of the 3D projector, projecting a second beam of light from the 3D projector toward the reference point as given in the backsight mode of the 3D projector, and measuring with the rangefinder a backsight distance to the as-built surface;

with the processor, determining corrected 3D coordinates of the as-built surface based at least in part on the first frontsight angle, the second frontsight angle, and an average of the measured frontsight distance and the measured backsight distance; and storing the corrected 3D coordinates of the as-built surface.

10. The method of claim 8 further comprising:

steering with a first galvanometer mirror and a second galvanometer mirror a beam of light from a galvanometer light source to a first multiplicity of positions on a first compensation mirror and receiving first returning light at a galvanometer optical detector, wherein the first galvanometer mirror, the second galvanometer mirror, the galvanometer light source, and the galvanometer optical detector are part of a galvanometer system, the galvanometer system being operatively coupled to the first compensation mirror;

steering with the first galvanometer mirror and the second galvanometer mirror a beam of light from the galvanometer light source to a second multiplicity of positions on a second compensation mirror and receiving second returning light at the galvanometer optical detector, the galvanometer system being operatively coupled to the second compensation mirror;

determining with a processor an angular offset parameter and an angular scale parameter of the galvanometer system based at least in part on the first multiplicity of positions and the second multiplicity of positions; and storing the determined angular offset parameter and the determined angular scale parameter.

11. The method of claim 8 further comprising:

projecting a beam of light from the three-dimensional (3D) projector onto a position detector on a mobile marking device;

directing the mobile marking device to move along a designated path based at least in part on positions of the beam of light projected onto the position detector;

releasing a marking material from the mobile marking device onto a surface proximate to the designated path; and storing the positions of the beam of light on the position detector.

12. A system comprising:

a stand;

a three-dimensional (3D) projector affixed to the stand, the 3D projector having a projecting mechanism and a gimbal mechanism, the projecting mechanism being operable to steer a beam of light to a projection angle relative to the gimbal mechanism, the gimbal mechanism being operable to steer the 3D projector to a gimbal angle relative to the stand; and a processor configured to:

determine a six degree-of-freedom (six-DOF) pose of the 3D projector based at least in part on steering at least one of the projecting mechanism and the gimbal mechanism to place the beam of light on each of a plurality of anchor targets in each of a first instance and a second instance, each of the plurality of anchor targets having a respective one of a plurality of anchor points with 3D coordinates known in a computer-aided design (CAD) model, each projection angle and gimbal angle to each of the plurality of anchor targets being different in the first instance and the second instance, wherein at least one of: the projection angle in the second instance comprises a negative of the projection angle in the first instance, and the gimbal angle in the second instance comprises a negative of the gimbal angle in the first instance; and store the determined six-DOF pose of the 3D projector.

13. The system of claim 12, wherein the projecting mechanism further is configured to emit a first beam of light onto a first galvanometer mirror, rotate the first galvanometer mirror to a first mirror angle with a first galvanometer motor, reflect the first beam of light off the first galvanometer mirror onto a second galvanometer mirror, rotate the second galvanometer mirror to a second mirror angle with a second galvanometer motor, and send the first beam of light out of an exit-aperture of the 3D projector.

14. The system of claim 12, wherein the processor is further configured to determine angular scale error parameters of the projecting mechanism and angular offset error parameters of the projection mechanism.

15. The system of claim 12, wherein determining the six-DOF pose of the 3D projector further comprises, for each of the plurality of anchor points and in each of the first instance and the second instance:

sending the beam of light to a plurality of positions on the anchor target; and determining a position of the anchor point on the anchor target based at least in part on a signal produced by an optical detector of the 3D projector, the signal being produced in response to light reflected off the plurality of positions.

16. The system of claim 12 wherein determining the six-DOF pose of the 3D projector further comprises, for each of the plurality of anchor points and in each of the first instance and the second instance: determining a position of the anchor point on the anchor target based at least in part on an image of the anchor target captured by an image sensor operably coupled to the 3D projector.

17. The system of claim 12 wherein the projecting mechanism is further configured to project a projected pattern of light onto an as-built surface, the projected pattern of light taking a form of a glowing template pattern, the projected pattern of light based at least in part on the CAD model and the determined six-DOF pose.

18. The system of claim 17 wherein the projected pattern of light is based on a distance to the as-built surface measured by a rangefinder of the 3D projector, the rangefinder being either integral to the projecting mechanism or included as a separate element of the 3D projector.

19. The system of claim 17 wherein the projecting mechanism projects the projected pattern of light onto the as-built surface, the projected pattern of light further based at least in part on a determining of 3D coordinates of a plurality of surface points on the as-built surface.

20. The method of claim 1, further comprising:

determining, based on the determined six-DOF pose of the 3D projector, a beam steering horizontal angular scale error parameter, a beam steering vertical angular scale error parameter, a beam steering horizontal angular offset parameter, and a beam steering vertical angular offset parameter;

applying a beam steering correction to a horizontal galvanometer mirror based on the beam steering horizontal angular scale error parameter, the beam steering horizontal angular offset parameter, and a horizontal beam steering angle applied to the horizontal galvanometer mirror; and applying a beam steering correction to a vertical galvanometer mirror based on the beam steering vertical angular scale error parameter, the beam steering vertical angular offset parameter, and a vertical beam steering angle applied to the vertical galvanometer mirror.

* * * * *